(«12») United States Patent
Brockmann

(10) Patent No.: US 8,661,847 B2
(45) Date of Patent: Mar. 4, 2014

(54) PRODUCTION OF A CLEAN GAS, IN PARTICULAR FOR TESTING A PRESSURIZED CONSTRUCTION COMPONENT FOR LEAKS

(76) Inventor: Robert Brockmann, Greifswald (DE)

( * ) Notice: Subject to any disclaimer, the term of this patent is extended or adjusted under 35 U.S.C. 154(b) by 404 days.

(21) Appl. No.: 13/058,256

(22) PCT Filed: Aug. 3, 2009

(86) PCT No.: PCT/EP2009/005608
§ 371 (c)(1),
(2), (4) Date: Feb. 16, 2011

(87) PCT Pub. No.: WO2010/017904
PCT Pub. Date: Feb. 18, 2010

(65) Prior Publication Data
US 2011/0132076 A1    Jun. 9, 2011

(30) Foreign Application Priority Data
Aug. 11, 2008  (DE) .......................... 10 2008 037 300

(51) Int. Cl.
*F25J 3/08* (2006.01)
(52) U.S. Cl.
USPC .................................. 62/617; 62/639; 62/640
(58) Field of Classification Search
USPC .................................................. 62/617–656
See application file for complete search history.

(56) References Cited

U.S. PATENT DOCUMENTS

| 2,580,710 A | 1/1952 | Wildhack |
| 3,192,730 A | 7/1965 | Hildebrandt |
| 3,442,091 A | 5/1969 | Klipping et al. |
| 4,136,721 A | 1/1979 | Holmqvist et al. |

(Continued)

FOREIGN PATENT DOCUMENTS

| DE | 767216 | 3/1952 |
| DE | 2009197 A1 | 9/1971 |

(Continued)

OTHER PUBLICATIONS

Robertson, "Dry Nitrogen Gas: Simple Laboratory Production", J. Sci. Instrum., vol. 41, pp. 506-507 (1963).

(Continued)

*Primary Examiner* — Wayne Langel
(74) *Attorney, Agent, or Firm* — Caesar, Rivise, Bernstein, Cohen & Pokotilow, Ltd.

(57) ABSTRACT

A process is described for producing a clean gas, which is provided, in particular, for testing a pressurized construction component (100) for leaks, which process includes the steps of providing a liquefied gas mixture (1) which contains the clean gas (2) and at least one foreign gas (3) in a gas separation unit (20), enriching the clean gas (2), wherein the at least one foreign gas (3) is transferred to a surface region of the liquefied gas mixture (1), and taking off the enriched clean gas (2), wherein the enriched clean gas (2) flows out of a volume region of the gas separation unit (20) via a guide unit (22), and wherein a foreign gas barrier (23) is formed at the guide unit (22), using which the foreign gas (3) in the liquefied gas mixture (1) is passed out from an opening in the guide unit (22). A device for producing a clean gas, a noble-gas-free gas composition and a process for testing a construction component pressurized with a test gas for leaks are also described.

10 Claims, 15 Drawing Sheets

(56) References Cited

U.S. PATENT DOCUMENTS

| | | | |
|---|---|---|---|
| 4,595,405 A * | 6/1986 | Agrawal et al. | 62/646 |
| 5,061,297 A | 10/1991 | Krasberg | |
| 5,421,164 A | 6/1995 | Brugerolle | |
| 5,661,225 A | 8/1997 | Ridgeway et al. | |
| 5,836,172 A | 11/1998 | Gary et al. | |
| 5,857,356 A | 1/1999 | Gary et al. | |
| 5,913,893 A | 6/1999 | Gary et al. | |
| 5,937,672 A | 8/1999 | Gary et al. | |
| 6,223,558 B1 * | 5/2001 | Yi | 62/623 |
| 6,505,472 B1 * | 1/2003 | Cheng et al. | 62/93 |
| 2009/0173136 A1 | 7/2009 | Brockmann | |

FOREIGN PATENT DOCUMENTS

| | | |
|---|---|---|
| DE | 3224339 A1 | 1/1984 |
| DE | 3873926 T2 | 4/1993 |
| DE | 4137070 A1 | 5/1993 |
| DE | 19635943 A1 | 3/1998 |
| DE | 69312843 T2 | 3/1998 |
| DE | 19640711 A1 | 4/1998 |
| DE | 19853049 A1 | 6/2000 |
| DE | 69705241 T2 | 5/2002 |
| DE | 10306245 A1 | 8/2004 |
| DE | 102006016747 A1 | 10/2007 |
| EP | 0834711 A2 | 10/1997 |
| FR | 2125683 | 9/1973 |
| SU | 1019160 A | 5/1983 |
| WO | 9500827 A1 | 1/1995 |

OTHER PUBLICATIONS

International Search Report for PCT/EP2009/005608 dated Jun. 16, 2010.

* cited by examiner

PRODUCTION OF A CLEAN GAS, IN PARTICULAR FOR TESTING A PRESSURIZED CONSTRUCTION COMPONENT FOR LEAKS

BACKGROUND OF THE INVENTION

The invention relates to a process for production of a clean gas that is provided in particular for testing a pressurized construction component for leaks, in particular a process for production of pure nitrogen, oxygen, argon or carbon dioxide, which is free of any other gases, in particular noble gases such as helium. The invention also relates to uses of the clean gas. Further, the invention concerns a noble gas free, in particular a helium-free gas composition and its use. The invention further relates to a process for performing leak tests on a construction component pressurized with a test gas such as a process for performing leak tests with localization of leaks within an accessible testing chamber, which is flooded with noble-gas-free air. The invention particularly relates to pressurization of containers, for example a vacuum vessel of a particle accelerator, with a noble-gas-free clean gas, with a slight overpressure, in order to prevent atmospheric noble gas from flowing into the vessel.

Testing the tightness of construction components such as containers, receptacles, reactors or similar items, represents a very important task in vacuum engineering and for other engineering technologies such as clean room technology and the design of liquid containers. The flushing gas method is often used for testing the tightness in which, for example, the inner surface of a construction component has pressure applied to by a pressurized test gas and an opposing, external surface of the construction component is flushed with flushing gas in a locally limited gas space. If the construction component is leaking the test gas can pass into the flushing gas and be detected in it by using a mass spectrometer. Applications of the flushing gas method are described, for example, in DE 2 009 197 (testing fuel tanks), DE 24 137 070 C2 (testing construction components with joints) and in DE 10 2006 016 747 A1 (leak testing in vacuum engineering). Gas used as a test gas (or: leak gas, test gas) is typically helium, while the flushing gas comprises a technical gas or a gas mixture, such as technical nitrogen or air.

The sensitivity of the flushing gas method, in particular the detection limit and/or the detection speed, depends on the purity of the flushing gas. If the flushing gas as such contains traces of the test gas the detection of the test gas escaping through a leak is aggravated. Therefore, to obtain high detection sensitivity it is of interest to have a flushing gas with the least possible concentration of test gas in it, in particular nitrogen with negligible quantities of helium in it.

Various chemical reactions are known to produce chemically pure nitrogen such as conversion of ammonium nitrite which are not, however, suitable for preparation of flushing gas in the quantities needed in practice due to the costs involved and the yields achievable. Nitrogen can also be produced through fractionation of liquid air (air separation). Details of the air separation are explained below with reference to FIG. 7. The disadvantage, however, is that the nitrogen gas obtained from air separation still contains helium. Even commercially available high-purity gases, such as "Nitrogen 7.0" (manufacturer: Linde AG, Germany) is not free from helium and is therefore only of limited value for use for high sensitivity tightness testing. It has been shown in practice that the conventional technical gases used to detect the tightness of construction components are contaminated with helium so the sensitivity of conventional testing is limited.

Only when clean gases were produced for the electrical industry it was possible to reduce the concentration of volatile gases. Thus a process is described in DE 196 40 711 A1 which allows to reduce the concentration of volatile gases in nitrogen into the ppb range. DE 693 12 843 T2 describes a process for providing technical nitrogen containing impurities in the order of 100 ppb. While these processes allow for a reduction in the residual concentration of volatile gases, the remaining concentration of the volatile gases still being too high for use as a flushing gas for precision testing of tightness.

A process has been proposed by J. H. Robertson ("J. Sci. Instrum.", Volume 40, 1963, page 506) for the production of water-free nitrogen, by evaporating liquid nitrogen locally and feeding the released nitrogen to the respective application, for example flushing in low temperature X-ray diffraction experiments. Also this process has the disadvantage that the evaporated nitrogen is indeed water-free but still contains helium impurities. The helium concentration in the nitrogen is in a very similar concentration to that found in atmospheric air. Thus the water-free nitrogen is only of limited suitability for use for high sensitivity leak testing.

The fact that the previously used, technically produced flushing gases have been contaminated and, for example, the contamination from helium in nitrogen is roughly in the same order as of that found in air (about 5 ppm) means that the sensitivity of conventional leaks tests is about $5*10^{-7}$ Pa*l/s.

There is a need for extremely pure flushing gases for practical applications in vacuum engineering or for other tasks in the leak testing area, in particular for large volume construction components, which allow determination of the tightness of a construction component with a sensitivity of up to $10^{-13}$ Pa*l/s.

For particularly large construction components such as a plasma vessel in a nuclear fusion experiment, a high-purity room or a ship's hull, there is some interest in designing the local gas space (testing chamber) in such a way that a person can enter it. This allows targeted and rapid localization of leaks in the container but is based on the prerequisite that a breathable physiological gas is used as flushing gas. The fact that only air with the naturally occurring concentration of helium is available as a flushing gas for conventional tightness testing with accessible testing chambers means that the detection limits for the tightness testing has been limited until now to relatively high values (see above).

Another known technique for tightness testing is the vacuum method in which, for example, a high vacuum is generated on the inner surface of the construction component to be tested and the outer surface is pressurized with a test gas. Passage of the test gas into the inner vacuum can, for example, be detected using a mass spectrometer. It is true that a significantly higher leak rate of $10^{-13}$ Pa·m$^3$/s can be achieved using the vacuum method. However, the vacuum method does have the significant disadvantage that the construction component must be evacuable. Thus thin-walled construction components cannot be tested using the vacuum method. Furthermore, leaks cannot be localized or only localized within certain limits using the vacuum method.

The above-mentioned limitations for the production of flushing gas which is free of test gas do not only exist for the combination of nitrogen as flushing gas with helium as test gas but also exist, depending on the concrete application of a leak test, for other gas combinations.

The objective of the invention is to provide an improved process for the production of a clean gas which is suitable for use as a flushing gas and allows overcoming the disadvantages and limitations of the conventional techniques. The objective of the invention is also to provide a correspondingly improved device for the production of a clean gas. Further, the objective of the invention is to provide an improved clean gas which particularly allows the use of the flushing gas method with an improved detection sensitivity. The objective of the invention is also to provide an improved process for leak testing with which the disadvantages of the conventional technique are avoided and which is characterized by a significantly improved detection limit. The invention is to develop generic overpressure processes for recognizing or evaluating leaks in such a way that even the smallest concentrations of a test gas, for example helium, down to $10^{-13}$ Pa·m³/s can be determined by a modified leak detector.

These objectives are solved by the process, the device and the gas composition of the invention arise from the dependent claims.

SUMMARY OF THE INVENTION

According to a first aspect, the invention is based on the general technical teaching to obtain a clean gas from a gas mixture which contains the clean gas and at least one foreign gas by liquefying the gas mixture, taking a quantity of liquid out of a volume region of the liquefied gas mixture and expanding the removed quantity of liquid. During removal the enriched clean gas flows out of the volume region over a conduit device and a foreign gas barrier is formed at the conduit device through which the foreign gas in the liquefied gas mixture is led away from an opening of the conduit device.

According to a further aspect, the invention is based on the general technical teaching to provide a device for the production of a clean gas which contains a gas mixture source for providing the liquefied gas mixture which contains the clean gas and at least one foreign gas, a gas separation device for receiving the liquefied gas mixture and for separation of the clean gas from the liquefied gas mixture, and a conduit device for removal of the clean gas from the gas separation device, the conduit device being provided with a foreign gas barrier with which an opening of the conduit device can be shielded from the rising foreign gas in the liquefied gas mixture.

The inventor has asserted that the foreign gas contamination in the liquefied gas mixture is not distributed homogeneously but rather a concentration distribution of the foreign gas is given, the concentration distribution within the gas mixture being influenced by the density of the carrier gas. This particularly applies for helium within the liquefied fraction of nitrogen. Through removing the quantity of liquid from the volume, in particular out of a region at a maximum distance from the surface of the liquefied gas mixture as, for example, from the area at the bottom of the vessel in which the liquefied gas mixture is received, it is possible to extract clean gas with a reduced concentration of foreign gas, that is, clean gas with the highest purity.

Collection of the foreign gas in a surface region of the liquefied gas mixture can be based on various mechanisms, for example on different boiling points of the gases, on temperature differences or on interactions of the atoms in the gas mixture. The question of which of the mechanisms is realized depends on the chemical, physical and thermodynamic properties of the gases contained in the gas mixture. If, for example, a gas mixture contains nitrogen as the clean gas and helium as the foreign gas, there are only very low dipole forces acting between the nitrogen atoms and the helium atoms. This is because the helium atoms are almost completely nonpolar towards the nitrogen atoms. The bottom-line is that primarily thermodynamic processes are of importance for processes for separation of helium.

The inventor was also able to prove that, during separation of helium in a column of liquid nitrogen with the evaporated fraction being heated up to room temperature, the helium is more enriched in the warmest part of the column. This is due to the fact that the average speed of the helium atoms at room temperature is significantly higher than that at the temperature of the liquid nitrogen $$\left(c_{average\ speed} = \sqrt{\frac{8*R*T}{\pi*M_{Molar}}}\right).$$

This difference in the average speed leads to an uneven distribution of the helium atoms within the columns.

Furthermore, the formation of a foreign gas barrier according to the invention can advantageously lead to the concentration of the foreign gas in the clean gas, which is taken from the volume region of the liquefied gas mixture, being significantly further reduced. The foreign gas barrier has the effect that the conduit device for removal of clean gas from is screened from the rising foreign gas in the liquefied gas mixture. For example, in the separation of helium from nitrogen there is a helium partial pressure equilibrium between the liquid phase (liquefied gas mixture) and a gaseous phase above it. There is helium bound in liquid phase due to this partial pressure equilibrium which diffuses above the liquefied gas mixture when the partial pressure in the gaseous phase is reduced. The helium rises in the liquefied gas mixture. The foreign gas barrier prevents passage of the rising helium into the conduit device.

According to the first aspect it is provided according to the invention in particular, to obtain a clean gas from a gas mixtures containing impurities which contains clean gas and at least one foreign gas, wherein the gas mixture is liquefied, a certain quantity of liquid is taken out of the volume region of the liquefied gas mixture and the removed quantity of liquid is evaporated.

In order to generate an extremely pure flushing gas the purified fraction can again be liquefied and evaporated, and, in particular, be subjected to the inventive process according to the first aspect. This process step can be repeated several times until all volatile impurities have been deposited.

To prevent volatile impurities from flowing into the separated pure fraction in the procedural coupled plant due to a difference in partial pressure, they are preferably decoupled mechanically or by using foreign gas barriers. For example, the pure fraction flows via a conduit device with a foreign gas barrier being placed on the conduit device which prevents the volatile impurities already separated in the first process step from flowing back into the pure fraction.

There is also the possibility to remove the separated volatile impurities in a regulated manner during the individual process steps. One option for targeted removal of the volatile impurities is represented by the process described in DE 767216 in which the fraction enriched with helium and neon is collected in the upper part of an evaporator condenser in order to remove this in a targeted way. A foreign gas barrier is provided in to prevent the already separated helium from again diffusing into the liquefied fraction via which the unclean fraction flows off in a regulated manner.

Furthermore, for optimal separation of volatile gases it is preferably provided that a certain portion of the liquefied gas is expanded and separated. This part should preferably be at least 1% per process step of the continuously generated liquid volume flow. Preferably, this can escape within a column. For example, a cylindrical column with a leakage volume of $\frac{1}{1000}$ has the effect that the impurities in the liquefied fraction can be reduced by a factor of 1000. This is due to the fact that the proportion of the volatile concentrations in the gas fraction and the liquefied fraction are to be considered being of the same size. For example, for a liquefied fraction whose residual concentration of helium is 1 ppm, the proportion of helium in one liter of liquid will be reduced to 1 ppb for an evaporation volume of 1,000 liters.

Advantageously, there are a number of options available to form the foreign gas barrier at the conduit device. According to a first variant the foreign gas barrier consists of a tapered pipe which is encompassed by a heating device. The heating device is used to evaporate part of the liquefied nitrogen so that the liquid fraction is cleaned free of helium by the rising bubbles. According to a second variant a siphon tube can be used to prevent the foreign gas from flowing into the conduit device. The siphon tube advantageously allows particularly effective screening from the rising foreign gas. According to a third variant a mouth hood can be provided at an inlet opening (mouth) of the conduit device to remove the clean gas. In this case there are advantages arising due to the particularly compact structure of the foreign gas barrier. According to a fourth variant the foreign gas barrier is formed by a spherical shell-shaped mouth cover with at least one cannula which particularly offers advantages for removal of bubbles of foreign gas. Finally a multi-walled siphon system can be provided as a conduit device in which the foreign gas is lead away from the mouth of the conduit device.

There are also various possibilities for the production of an extremely clean gas at the consumer location. Various variants exist, for example, of devices for the production of clean gases or extremely clean gases. According to one variant a taper can be used, for example, encompassed by a heating device in order to prevent flowing of the foreign gas into the conduit device (FIG. 1A). Further, a siphon tube (FIG. 2) advantageously allows particularly effective screening from the rising foreign gas.

According to a further variant, the foreign gas barrier is formed by a mouth cover with a number of cannula which particularly has advantages for the draining of bubbles of foreign gas (FIG. 3).

Further options arise, for example from use of a gas separation device in which the volatile impurities can be separated from the flushing gas (FIG. 4A) as well as from the introduction of an unclean gas under pressure into an undercooled liquefier (FIG. 4B).

One further advantageous embodiment of the invention is characterized by reception of the enriched clean gas removed from the liquefied gas mixture in a closed clean gas reservoir which is separated from the liquefied gas mixture by a partial pressure separator. Thus, advantageously, prevents a permanent foreign gas partial pressure equilibrium from occurring between the liquefied gas mixture and the clean gas reservoir.

The term "gas mixture" refers in general to a mixture of various gases, in that a first gas component represents the clean gas to be extracted and at least one further gas component represents the foreign gas to be separated from the clean gas. Particularly preferably the gas mixture comprises liquefied air or a nitrogen-containing fraction of liquefied air such as noble-gas-containing nitrogen gas. The term "nitrogen gas" refers in general to a composition of gases which contains nitrogen or chemically pure nitrogen. Advantageously, the clean gases nitrogen, oxygen or argon can be extracted from air- or noble gas containing nitrogen gas. The terms "nitrogen", "oxygen" and "argon" refer to the chemically pure substances, respectively. Advantageously these clean gases have already proven to be suitable for use as a flushing gas in conventional techniques in composition with further noble gases. The foreign gas separated from the clean gas preferably comprises helium. The inventor has asserted that separation of helium from other gases takes place particularly effectively in a liquefied gas mixture.

Advantageously the extremely clean gas can be extracted with a high yield and high speed from the volume, preferably from the volume of the liquefied parts of the air or a liquefied noble gas containing gas mixture near the bottom of the tank. It is advantageous that the separated unclean fraction generated during production of extremely clean gases can, for example, be used as a calibration gas. This is particularly true for calibration of measuring systems according to the flushing gas method.

Further, it is possible to prepare the fraction obtained when separating clean gas from gas fractions with a larger concentration of impurities as a test gas.

According to one particularly preferred embodiment of the invention the clean gas is produced with a foreign gas concentration of less than 1 ppb, in particular less than 10 ppt. Advantageously the invention allows provision of gases or gas mixtures for leak testing in which the concentration of test gas, in particular helium, is below the limit detectable by the measuring instruments used. This is currently secured by a concentration of 10 ppt. If the gases freed from helium or the gas mixtures freed from helium are used to determine the tightness of a construction component, the traceability of leaks in the test pieces is improved significantly so that the tightness of a test piece can be detected at less than $10^{-11}$ Pa*m$^3$/s. One should also mention measurement processes for determining the He permeation. Use of gases or gas mixtures freed from helium also makes the measurement processes for determining the permeation significantly more sensitive.

According to a further preferred embodiment of the invention the enriched clean gas comprises a gas composition of nitrogen and oxygen. The gas composition is free of noble gases, in particular free of helium. To produce the noble-gas-free gas composition, nitrogen and oxygen are produced and mixed together as noble-gas-free gases using the process according to the invention which, in particular, have a noble gas content below 10 ppt. Particularly preferably, the noble-gas-free gas composition is formed as a physiological gas. The term "physiological gas" refers to a gas which is respirable for human beings. The physiological gas is particularly suitable to be breathed in by a person (for example a leak detection specialist or operator) for at least one hour without having any negative effect on his health. The physiological gas provided according to the invention as a noble-gas-free gas has the particular advantage that it is suitable for flushing a large gas space which a person can enter. The person can, in a targeted manner, search for leaks on the construction components to be investigated in the gas space and thus quickly localize leaks even on elongated construction components.

Advantageously a noble-gas-free diffusion moderator gas can be added to the clean gas produced using the process according to the invention, in particular the noble-gas-free gas composition. The diffusion moderator gas is suitable for reducing the diffusion speed of a test gas, such as helium, in the gas space. The preferred gases to be used as a noble-gas-free diffusion moderator gas are carbon dioxide, hydrogen and/or steam.

Accommodation of the enriched clean gas in a clean gas reservoir takes place according to a preferred embodiment of the invention in such a way that a quantity of liquid of the enriched clean gas in a liquefied condition is removed from the volume of the liquefied gas mixture and transferred in a liquid or gaseous state into the clean gas reservoir. When the liquefied gas mixture is provided in a thermally insulated tank of the gas separation device, removal of the quantity of liquid is preferably done by use of a liquid line which opens at the bottom of the tank and which is connected with the clean gas reservoir. Advantageously the liquefied gas mixture at the bottom has the maximum hydrostatic pressure in the tank, so that enrichment of the clean gas at the bottom is at a maximum. The liquid removed at the bottom has the lowest concentration of volatile impurities.

According to the invention at least one separating device can be integrated in the liquid line from the tank to the clean gas reservoir, which is adapted to lead away any still existing traces of the foreign gas in the clean gas.

Advantageously the foreign gas concentration can still be reduced using the separating device.

According to further advantageous variants of the invention the gas separation device and the liquefied gas mixture arranged therein can be cooled using a cooling device. Furthermore, the liquefied gas mixture can be fed to the gas separation device in droplet form wherein it is preferable to use a liquid distributor. Furthermore a surface cooler can be provided in the conduit device with which the residual gas traces can advantageously be separated from the clean gas.

The clean gas reservoir can advantageously be formed by various types of vessels. For example, according to one variant of the clean gas reservoir, a gas tight gas container can, for example, be a gas cylinder. The gas container offers advantages for transport of the clean gas to the location of use, as flushing gas for example. According to a further variant the clean gas reservoir can be a Dewar vessel that is preferably provided for receiving the clean gas in a liquid or a solid condition. The gas container preferably has diffusion protected locking members (valve, shut-off valve). Advantageously the clean gas in the gas container can be protected from diffusion of foreign gas from the environment around the gas container. Particularly, diffusion of helium into the gas container is avoided.

To receive the extremely pure nitrogen, a cleaning of the clean gas reservoir is carried out, so that the concentration of the highly volatile gases in the clean gas reservoir is less than 1 ppb. This can be achieved in that the clean gas reservoir is flushed with extremely pure flushing gas until the final concentration of 1 ppb is achieved or by evacuation of this clean gas reservoir until a leak rate of less than $10^{-9}$ mbar*l/s is achieved.

The surfaces inside the clean gas reservoir are preferably polished and/or coated with a noble metal such as gold to reduce the required flushing times or evacuation times so that the possibility of contamination through helium from pore clusters is prevented. It has also been shown that significant heating of the clean gas reservoir above room temperature can reduce the flushing times or evacuation times needed. Furthermore there is a risk with conventional gas reservoirs that atmospheric helium can flow into the extremely pure nitrogen via seals made of plastic. There should be exclusive use of a metallic seal or sealing systems to avoid this. One possibility is the subsequent welding of the sealed connections with a sealing seam. It should be tested to prove the tightness with the transport less that $10^{-9}$ mbar*l/s. The clean gas reservoir should also be provided with a system which prevents total removal of the extremely pure nitrogen. For instance a pressure sensor with a locking mechanism, so that remaining residual pressure is at least 2.5 bar.

According to a further aspect of the invention, the above-mentioned objective is solved by a process for leak testing on a construction component to be tested which is pressurized with test gas using the flushing gas method, for which a clean gas is used as the flushing gas in which the concentration of foreign gas is less than 1 ppb, in particular less than 10 ppt. The process according to the invention for leak testing has the advantage, when using the flushing gas method, that the test gas can be detected with significantly increased sensitivity and/or speed.

The clean gas to be used is preferably the enriched clean gas which was produced according to the above-mentioned aspect of the invention. Clean gas particularly comprises noble-gas-free nitrogen, carbon dioxide or oxygen gas or helium free argon gas. According to preferred variants of the leak testing according to the invention, a noble-gas-free gas composition made of nitrogen and oxygen is used as a flushing gas, in particular as a physiological gas, and/or a clean gas is used which contains a noble-gas-free diffusion moderator gas.

Advantageously the basis of the process for detection of the even the smallest test gas concentrations is separation of gases through liquefaction. For example atmospheric air with a natural helium concentration of 5.24+/−0.05 ppm can be split up into its ingredients in an air separation plant operating through liquefaction, using the Linde process, so that there is accumulation of the atmospheric helium in the air through separation off of oxygen and argon up to 6.89 ppm (the basis of the calculation is 5.24 ppm*100%/76%=6.89 ppm) in the remaining gas fraction which primarily consists of nitrogen.

For providing, for instance, helium-free nitrogen, the helium is deposited by liquefaction of nitrogen in further procedural steps. The liquefied nitrogen is evaporated after deposition of the helium. This evaporated nitrogen is technically free of helium. These gases, freed of helium, allow improving the sensitivity of a conventional overpressure process using helium by a factor of 10,000.

According to a preferred embodiment of the leak testing according to the invention the flushing gas is applied in the flushing device at an overpressure relative to the external environment of the flushing device. The overpressure which can, for example, be at least 5 mbar relative to the external atmospheric pressure, offers advantages concerning suppressing diffusion of the test gas concentrations which may be contained in the ambient air and which would reduce the sensitivity of the measurement process. Thus, overpressure as well as diffusion moderator gas can simplify localization of leaks in large flushing devices. Particularly pressurizing containers, for example a vacuum vessel of a particle accelerator, with a noble-gas-free clean gas at slight overpressure in order to prevent atmospheric noble gas from flowing into the vessel is provided.

Furthermore, the overpressure of the flushing gas can contribute to formation of the flushing device. If the flushing device has walls made of a flexible material such as a foil the outer form of the walls can be maintained relative to the construction component to be tested through the effect of the overpressure of the flushing gas. In this case feeding in of the flushing gas preferably takes place in such a way that the flushing device is initially blown up with compressed air and then subsequently flushed using the foreign-gas-free clean gas (flushing gas).

Furthermore, flushing with extremely pure flushing gas can be provided in such a way that the container to be tested or a testing chamber are cleaned before leak testing using the vacuum method so that detection of any leaks can take place faster according to the vacuum method. This particularly applies for series testing of test objects using the vacuum method. When filling a vacuum testing plant with test pieces, air flows into the testing plant and therefore also atmospheric helium. The result of this is that the background helium only reduces slowly when evacuating the testing chamber. This results either in very long pumping times, which do not at all match the short cycle times occurring in industrial production, or in oversized pumps which debit the cost side.

Advantageously the process according to the invention for leak testing can be provided using various types of flushing devices. According to a first variant the flushing device can comprise a chamber (or a room) with solid walls with advantages being involved for quantification of the leaks found on the examined construction component. The flushing device can also comprise a chamber with flexible walls according to a further variant which advantageously allows slight adaptation of the flushing device to the spatial conditions existing at the location where leak testing will take place. Furthermore, the flushing device can be formed according to a preferred embodiment of the invention by the construction component to be tested, such as the recipients (vacuum vessel) of a vacuum plant. In this case an interior space of the construction component is flushed with flushing gas while an outer surface of the construction component is pressurized with the test gas. Finally, the flushing device is dimensioned such that an operator can enter it.

According to a further variant of the invention, provision is made for a chamber which is part of a structure such as a clean room, and/or a room which is formed of a shell of a construction component to be tested, such as a protective hood on a technical plant.

Particular advantages are offered by the invention for leak testing of vacuum devices with an accessible inner room, which has a typical cross-sectional dimension of at least 1 m. The vacuum vessel of the vacuum device forms the flushing device which can be entered by operator. The vacuum vessel is first evacuated for leak testing in order to remove all residual gases and possible impurities. The vacuum vessel is then flushed with physiological clean gas produced according to the invention. To do this, preferably an overpressure relative to the environment is formed. The vacuum vessel can be entered by an operator in order to test the tightness of the installations in the vacuum vessel in a targeted manner which had previously been pressurized with the test gas helium.

There is also the possibility of testing the tightness of the vacuum vessel by enclosing it in a shell and pressurizing it with helium. To locate a leak, for example after a period of a few minutes, the vacuum vessel pressurized with test gas from the outside is sniffed from the inside. One further option for testing the tightness of the vacuum vessel is to close it off after entering it to generate a vacuum in the range of 10 mbar to 100 mbar, for example 50 mbar. Thus, the sensitivity of the leak testing from inside to outside can be improved with the upcoming pressure difference to the environment.

There is preferably at least one test gas sensor for leak testing positioned in the flushing device which is connected to a detector device for gas detection. The test gas sensor comprises for example a sniffer probe which is well known in conventional leak testing. Advantageously the test gas sensor can be positioned and moved by an operator in the flushing device when using a physiological gas as a flushing gas.

Advantageously the flushing device can be equipped with at least one personnel lock with gas-tight interlock doors in order to allow entry of an operator while operating the leak testing system. Furthermore, the flushing device can advantageously be equipped with a material lock with gas-tight lock doors. The material lock simplifies provision of devices or other materials in the flushing device while operating the leak testing system.

Advantageously the flushing device can be equipped with a clamping device with which the volume of the flushing device is adjustable, in particular reducible. Advantageously the clamping device allows an adaptation of the flushing device to the concrete requirements of a leak test regarding the flushing gas volume and the size of the surface of the construction component to be tested.

Further advantages for a variable adjustment of the measuring conditions for a leak test are given when the flushing device is equipped with a flushing gas regulating device. The flushing gas regulating device is set up to control a volume flow of the flushing gas fed into the flushing device. To do this the flushing gas regulating device preferably comprises a volume flow measuring device and/or a pressure sensor.

If the flushing device for the leak testing according to the invention is connected with a gas supply which is equipped with a partial pressure separator, advantageously transport of the test gas from the flushing device into the clean gas reservoir can be prevented, in particular of a noble gas such as helium. The partial pressure separator can completely exclude diffusion of a foreign gas into the clean gas.

If the flushing device is arranged on the outside of the construction component to be tested it is preferably directly connected via a gas-tight line and an inlet valve with a test gas supply device.

Advantageously a concentration of a noble gas, in particular of helium, and/or of oxygen, can be determined in the flushing device during the leak test using at least one gas sensor. This allows monitoring of the measurement conditions and/or the physiological conditions in the flushing device.

According to a further advantageous embodiment of the invention it is provided that the flushing device and/or the construction component to be tested is segmented into sub-chambers. Advantageously the leak testing can, in this way, be confined to certain parts of the construction components. Thus localization of leaks is simplified. Furthermore, leak testing on extended construction components such as plasma vessels, in particular those used for atomic fusion research, clean rooms or ship's hulls, can be simplified by segmentation.

BRIEF DESCRIPTION OF THE DRAWINGS

Further details and advantages of the invention will be described below with reference to the attached drawings. The following is shown.

DETAILED DESCRIPTION OF PREFERRED EMBODIMENTS

Features of preferred embodiments of the invention are described in the following while making reference to examples of extraction of extremely pure nitrogen, in particular of helium-free nitrogen and use of helium-free nitrogen as a flushing gas for leak testing. Implementation of the invention in practice is not limited to extraction of nitrogen but also applicable, in a corresponding manner, to other clean gases, such as carbon dioxide, oxygen or argon. Particularly noble-gas-free oxygen can be produced which is added to noble-gas-free nitrogen to form a noble gas free, physiological gas.

Details of liquefaction of gases or gas mixtures, measurement and controlling of gas flows, reception of gases in pressure vessels and the leak testing, in particular using the flushing gas method, are actually known from the prior art and will therefore not be described below. The leak testing according to the invention is not only usable for leak testing but also for other testing tasks such as testing the tightness of materials, containers or constructions.

Production of Clean Gas

Figure 1:
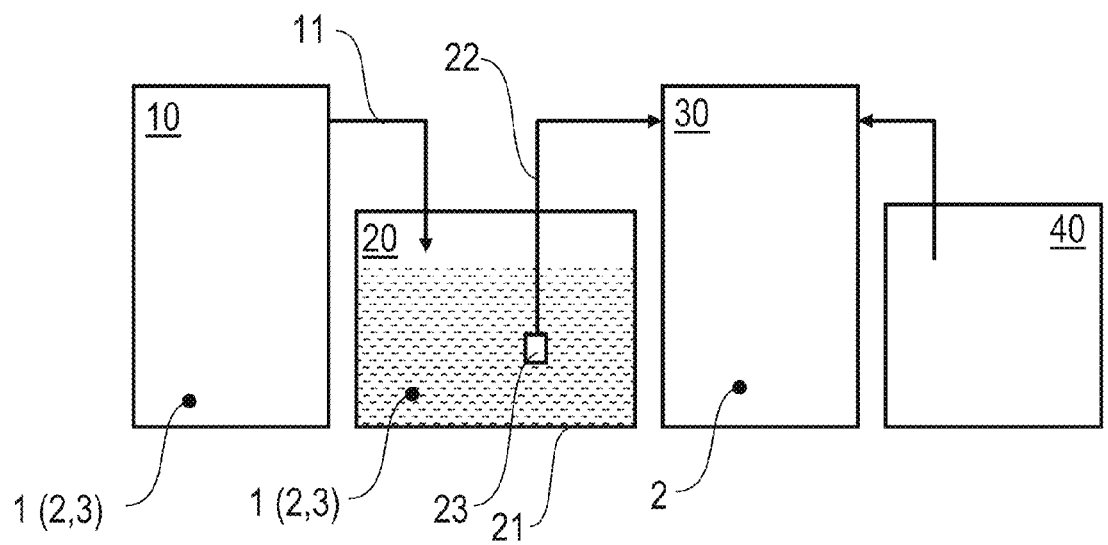
FIG. 1: a schematic representation of a device for the production of a clean gas according to a preferred embodiment of the invention.

FIG. 1 schematically shows a device for the production of an extremely pure gas (clean gas) according to the invention with a gas mixture source 10, a gas separation device 20 and a clean gas reservoir 30. An additional gas source 40 can be optionally provided. The gas mixture source 10 is adapted to provide a liquefied gas mixture 1 which contains the clean gas 2 and at least one foreign gas 3 and is connected via a feed line 11 with the gas separation device 20. The gas mixture source 10 and the gas separation device 20 can be mechanically decoupled from each other. The gas mixture source 10 comprises, for example, a procedural plant for separating air (air separation apparatus, see FIG. 7).

The gas separation device 20 is provided to receive the liquefied gas mixture 1 with the clean gas 2 and at least one foreign gas 3 and to enrich the clean gas 2. In general, enrichment of the clean gas comprises the separation of at least one foreign gas from the clean gas in the liquefied gas mixture. Furthermore, the gas separation device is adapted for removal of the clean gas in a liquid or gaseous condition from a volume region of the liquefied gas mixture. Details of removal of the clean gas are explained below.

The gas separation device 20 preferably comprises an hermetically sealed, thermally insulated tank 21 with a degassing volume (for example a Dewar vessel). A conduit device 22 is provided which leads from the inside of the tank 21 to the clean gas reservoir 30. The gas separation device 20 and the gas reservoir 30 can be decoupled (separated). The conduit device 22 is equipped with a foreign gas barrier 23 which is shown schematically in FIG. 1 and illustrated in FIGS. 1A, 2 to 4, 4A and 6 with further details. The conduit device 22 can comprise a simple pipe or a multi-walled siphon system as described below. Furthermore a partial pressure separator (see FIGS. 1A to 4) can be integrated in the conduit device 22. There is also the possibility to separate the volatile components using a gas separator, for example using a pipe filled with an absorbent charcoal (FIG. 4A), through which the impurities can escape. There is furthermore the possibility to extract a clean gas using the device described in FIG. 4B in which the flushing gas is liquefied in a pressure column and gaseous impurities in the head of the liquefier are separated.

The clean gas reservoir 30 is provided to receive the enriched clean gas 2. The clean gas reservoir 30 can, for example, comprise a gas cylinder to receive extremely clean gases or a Dewar vessel and is connected via a gas line with the gas separation device 20. The additional gas source 40 is also connected with the clean gas reservoir 30. The additional gas source 40 contains a gas-tight container for receiving a foreign-gas-free, in particular a noble-gas-free gas such as helium-free gas, which should be added if necessary to the clean gas 2 in the clean gas reservoir 30. Alternatively the additional gas source 40 can comprise a device for production of a clean gas with a further series of components 10, 20 and 30. Selection of the additional gas depends on use of the enriched clean gas 2. For producing a physiological gas composition as a flushing gas for a leak test, for example, oxygen can be added as a further clean gas to the clean gas nitrogen. Alternatively or additionally a diffusion moderator gas such as carbon dioxide, water or steam can be fed from the additional gas source 40 into the clean gas reservoir 30.

Figure 1A:
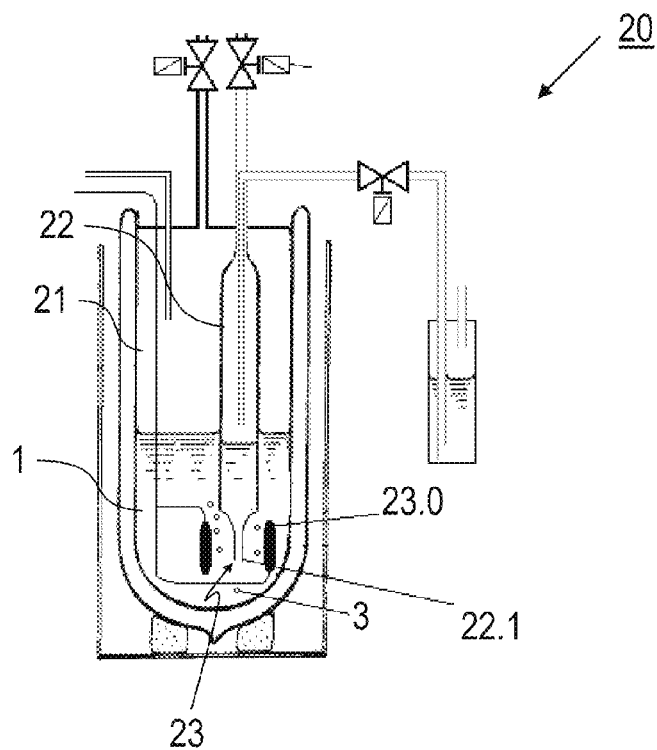
FIG. 1A: a first embodiment of a gas separation device used according to the invention with a foreign gas barrier.

FIG. 1A shows a first variant of the used gas separation device 20 according to the invention with the tank 21 to receive the liquefied gas mixture 1, the conduit device 22 and the foreign gas barrier 23. The foreign gas barrier 23 consists of a tapering of the open end of the conduit device 22 in tank 21. The foreign gas barrier 23 is encompassed by a heating device 23.0 which extends from the mouth 22.1 of the conduit device 22 into an area above the mouth 22.1. The heating device is used to evaporate part of the unclean fraction so that the liquid fraction is cleaned by the rising bubbles. Furthermore, the taper secures that the foreign gas 3, for example microscopically small helium bubbles, can only enter into the conduit device 22 to limited extent.

Enrichment of the nitrogen in the tank 21 is based on the following insights of the inventor. The liquid mixture 1, which is fed into the tank 21, initially has even distribution of the helium in the nitrogen. At the temperature at which the gas mixture is liquefied after air separation, about −195.79° C. for nitrogen, there are dipole forces existing between the atoms. These dipole forces produce much higher forces of attraction between the nitrogen atoms than for the helium atoms for which there are virtually no dipole forces present. As a result, the helium atoms can be easily transferred out of the liquefied fraction into the gaseous fraction. By generating a partial pressure difference by permanent removal of expanded liquid from an expansion volume, the helium atoms from the liquid fraction can be transferred into the gaseous fraction due to the partial pressure difference. As a result, the helium atoms are led to the upper surface of the liquefied gas mixture by providing an expansion volume and transferred into the gas fraction while there is extremely pure nitrogen, related to the volatile impurities, remaining in the volume of the gas mixture 1, in particular in the area of the maximum hydrostatic pressure, that is near the bottom of the tank 21, in particular chemically pure nitrogen. Rising helium is led away from the foreign gas barrier of the conduit device. By removal of a quantity of liquid from the volume of liquefied gas mixture, the enriched nitrogen is led out of tank 21 in order, optionally after at least one post cleaning step, to be received in the clean gas reservoir 30. Furthermore, through active heating of the evaporated gas in the head of a tank the helium can be stronger enriched in this area due to the increase in the average speed of the atoms.

Separation of helium from other gases such as carbon dioxide, argon or oxygen, takes place using the same mechanism as for separation from nitrogen since, for these gases at the temperature of the liquefied gas mixture, there are also differences in the forces acting between atoms which lead to separation of the liquid phases.

Figure 2:
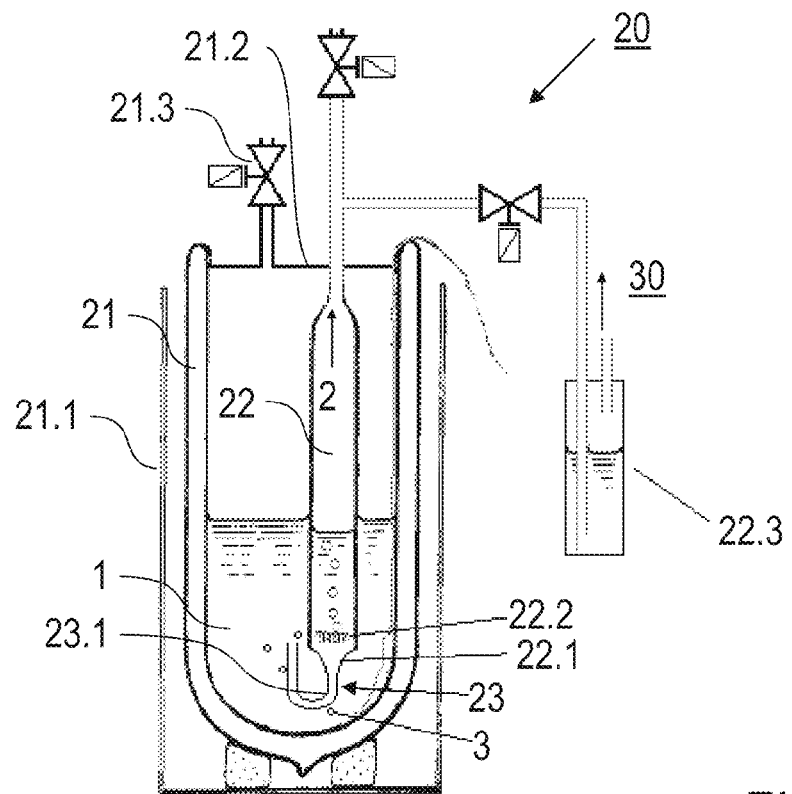
FIGS. 2 to 6: furthers embodiments of a gas separation device used according to the invention with a foreign gas barrier.

FIG. 2 shows a second variant of the gas separation device 20 according to the invention with the tank 21 to receive the liquefied gas mixture 1, the conduit device 22 and the foreign gas barrier 23. Parts of the gas separation device 20 which match the embodiment of the invention shown in FIG. 1A are labeled with the same reference number in FIGS. 2 to 6 as in FIG. 1A.

Tank 21 comprises a Dewar vessel which is arranged in a housing 21.1 to protect it against external influences. Tank 21 is hermetically sealed at its upper surface by a cover 21.2 into which the feed line 11 from the gas mixture source (see FIG. 1) and a discharge device (see below) are integrated.

The conduit device 22 comprises a cylindrical pipe which is arranged in tank 21 and which extends in a vertical direction from a bottom area in tank 21 to the cover 21.2. A heating device 22.2 can be optionally provided at the inlet opening (mouth) 22.1 of the conduit device 22. The heating device 22.2 is provided to heat the liquefied nitrogen 1 locally in order to transform the nitrogen into a vapor. The evaporated nitrogen is led via the conduit device 22 and the partial pressure separator 22.3 to the clean gas reservoir 30 (see FIG. 1). The partial pressure separator 22.3 prevents a helium partial pressure equilibrium arising between the tank 21 and the clean gas reservoir 30. Alternatively a heating device is not provided, in this case, the nitrogen being led away in a liquid form to the clean gas reservoir 30.

The foreign gas barrier 23 comprises a bent siphon pipe 23.1 which extends from the mouth 22.1 of the conduit device 22 into an area above the mouth 22.1. The siphon pipe 23.1 prevents the foreign gas 3, for example microscopically small helium bubbles, from entering the conduit device 22.

The discharge device 21.3 which is connected gas-tight to the cover 21.2 allows the gaseous nitrogen to constantly flow out of the tank 21 with an increased helium concentration. The helium partial pressure equilibrium in tank 21 is shifted in this way so that bound helium from liquid phase (liquefied gas mixture 1) is passed into the gaseous phase. The rising helium is led away by the foreign gas barrier 23 from the mouth 22.1 of the conduit device 22.

The tank can also have a device for generating pressure. This can take place by means of a thermodynamic process such as evaporation of a certain quantity of the liquefied technical gas.

Figure 3:
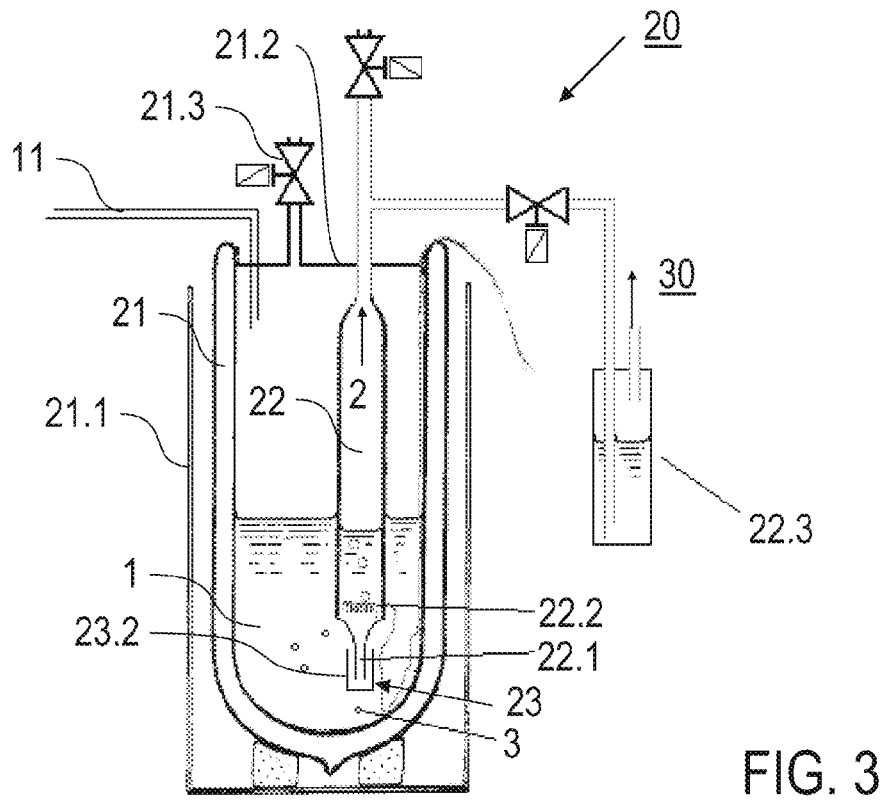

FIG. 3 shows a further variant of the gas separation device according to the invention in which the foreign gas barrier 23 is formed by a mouth hood 23.2. The mouth hood 23.2, like the siphon pipe 23.1 described above, has the task of screening the mouth 22.1 of the conduit device 22 from rising helium in the liquefied gas mixture 1.

Figure 4:
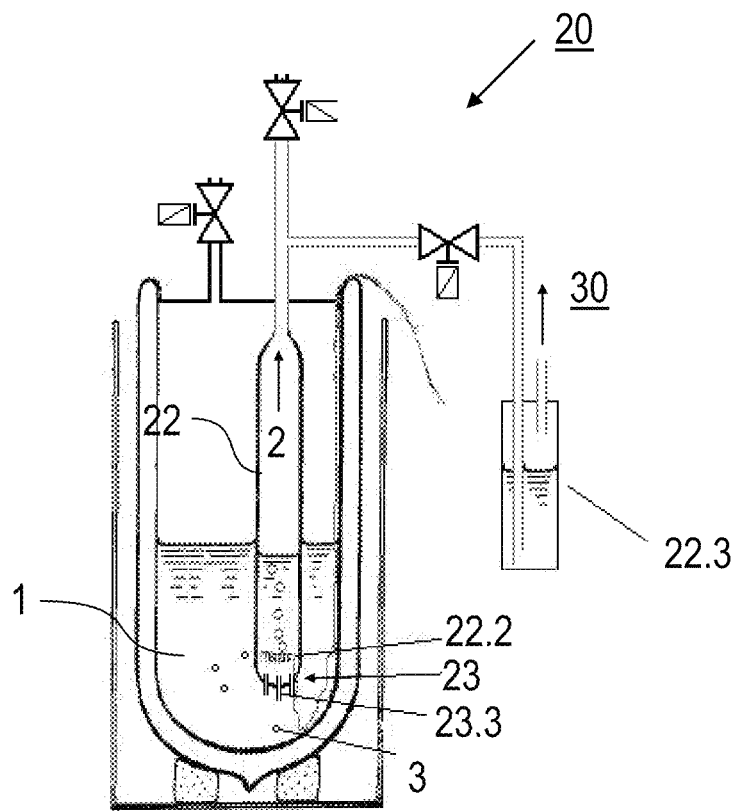

A spherical shell shaped mouth cover for the conduit device 22 is provided as a foreign gas barrier 23 for the variant of the gas separation device 20 according to the invention shown in FIG. 4. The mouth cover contains cannula 23.3 which extend in a direction axial to the conduit device 22. The cannula 23.3 with, for example, an internal diameter of 2 mm, project with a length of about 20 mm. The mouth cover with the cannula 23.3 prevents entry of the bubbles rising out of the liquid phase into the conduit device 22. The rounded mouth hood with cannula is selected in such a way that the rising gas bubbles cannot rise inside the conduit device 22 due to the small internal diameter of the cannula.

Figure 4A:
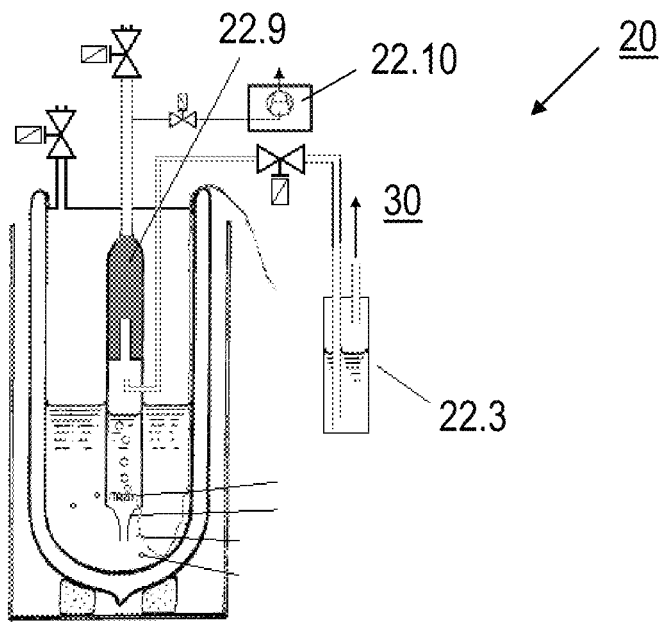

The variant shown in FIG. 4A is equipped, as in FIG. 1A, with a taper 22.1 of the open end of the conduit device 22 in tank 21 as a foreign gas barrier 23. Additionally, a gas separator 22.9 is provided in the conduit device 22 for separating the primary volatile impurities. The yield of clean gas can be advantageously increased with this variant. This variant also allows provision of an increased evaporation volume in order to increase the quantity of clean gas generated. The effectiveness of the separation can be advantageously increased in that the separated fraction is constantly being pumped off above the gas separator by a delivery pump 22.10.

Figure 4B:
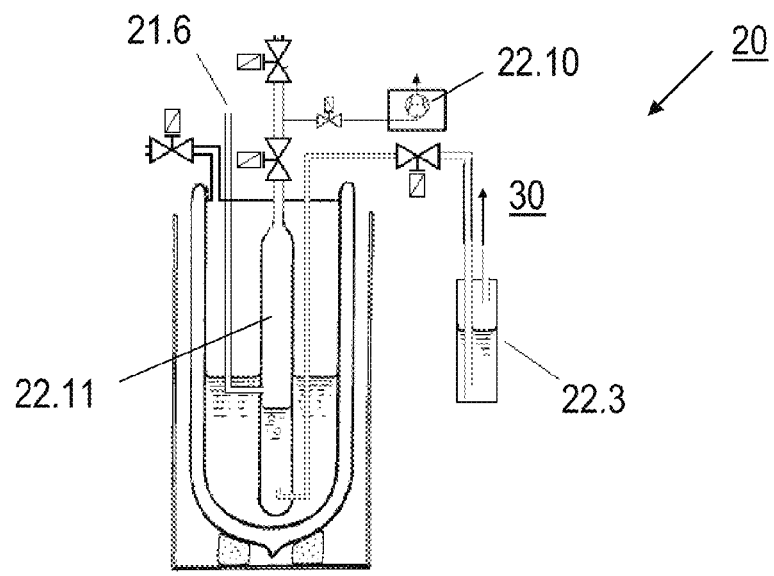

In the variant of the gas separation device 20 used according to the invention shown in FIG. 4B a cooling is provided to the liquefaction temperature under pressure to clean the gas. To do this a technical gas provided from gas cylinders is led through an additional line 21.6 into a liquefaction column 22.11 which forms the foreign gas barrier. Since the liquefaction column 22.11 is in an undercooled liquid bath, the pressurized flushing gas flowing in is liquefied. The impurities which cannot be liquefied rise into the upper part of the liquefaction column 22.11 where they can be removed in a regulated manner by the delivery pump 22.10. In order to extract the extremely clean gas, the liquefied gas flows from the liquefaction column 23.4 via the conduit device 22 and a partial pressure separator 22.3 into a clean gas reservoir 30.

According to the invention the following further measures can be provided for separating off helium from the nitrogen, in particular for the gas separation devices 20, according to FIGS. 1A, 2, 3, 4, 4A and 4B. The tank 21 can first of all be evacuated before filling with the liquefied gas mixture 1. Valves on the conduit device 22 are closed before the evacuated tank 21 is filled with the liquefied gas mixture 1. By forming a gas cushion in the conduit device 22 it can be avoided that the liquefied gas mixture is arranged in it. After feeding the liquefied gas mixture 1 into the tank 21 a waiting period is observed to allow outgassing of the helium bound in the liquefied gas mixture 1. The waiting period can be 15 minutes for example.

To clean the conduit device 22, the discharge device 21.3 is opened so that the gaseous phase with an increased helium concentration can flow out. The gaseous phase preferably escapes into the atmosphere. After closing the discharge device 21.3, receipt of the clean gas will take place in the clean gas reservoir 30. This can be evacuated before filling. The clean gas can subsequently be compressed in the clean gas reservoir 30 and put into gas cylinders (see below).

Enrichment of the clean gas in the tank 21 in stationary operation can take place in such a way that the tank 21 is initially filled with the liquefied gas mixture 1 and the clean gas is subsequently removed from the volume of the liquefied gas mixture 1 in the tank 21. For a total volume of liquefied gas mixture 1 in the tank 21 of 100 l, for example, 80 l of clean gas can be extracted. One particular advantage of the invention is that extraction of the clean gas is not limited to stationary operation. It is in fact possible to have a flow operation since separation of the foreign gas (helium) from the clean gas in the tank 21 takes place at a high speed. For example, enrichment of nitrogen in a 150 l tank for a strongly active evaporation just takes a waiting period of some seconds. In flow operation the liquefied gas mixture 1 can be fed continuously into the tank and the enriched clean gas removed from the tank. In this case the feed line 11 from the gas mixture source 10 preferably extends, in manner which deviates from the representation in FIG. 3, to above the outlet line 23 to remove the enriched nitrogen.

Figure 5:
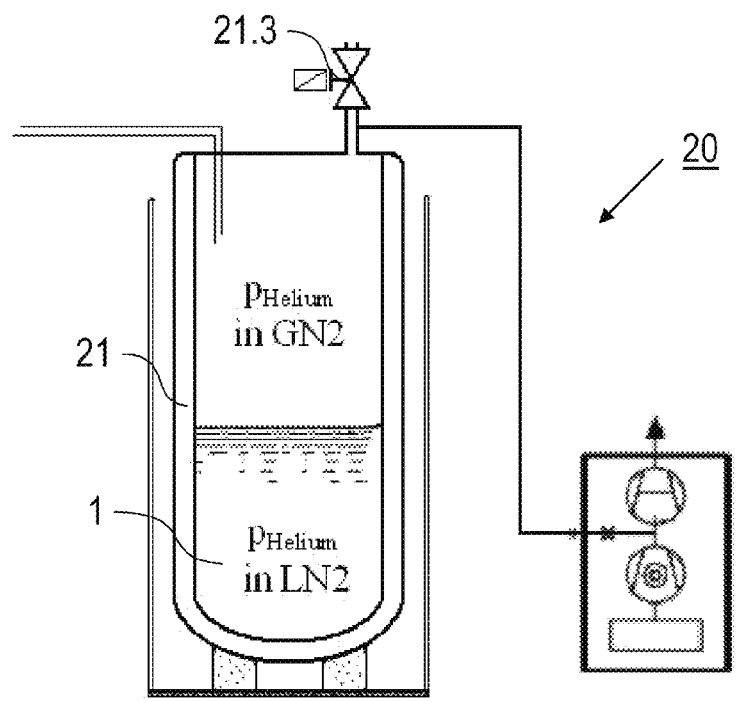
Figure 6:
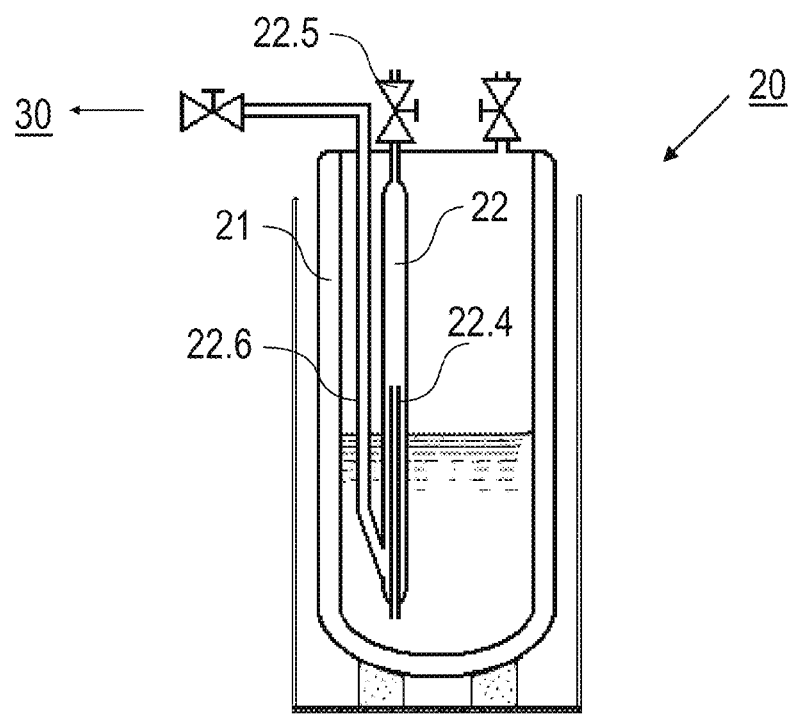

FIGS. 5 and 6 illustrate a further variant for formation of a foreign gas barrier in which the conduit device 22 comprises a multi-walled lifting system 22.4/22.6. According to FIG. 5 the liquefied gas mixture 1 is first located in tank 21 of the gas separation device 20. There is still a helium concentration in the liquefied gas mixture as in the atmosphere ($c_{He}$>5 ppm). After enriching the nitrogen in the liquid phase by collecting the helium on the surface of the liquid phase a residual fraction of helium remains in the liquid gas mixture 1. During a waiting period for a quiet storage for some hours a helium partial pressure equalization occurs between the liquid and the gaseous phase until a state of equilibrium is reached.

The concentration of helium in the liquid phase is subsequently reduced by flowing out of the gaseous phase via the discharge device 21.3. A new partial pressure equilibrium is established between the gaseous and the liquid phase due to the discharge. The concentration of helium in the gaseous phase in the discharge stream is constantly determined by the discharge device 21.3 for optimal adjustment of the equilibrium. As soon as the helium concentration has reached a predetermined limit value the discharge device is further opened so that the gaseous phase flows out with the increased helium concentration.

Liquid nitrogen is subsequently removed at the bottom (the deepest area) of the tank 21 via the double-walled lifter system 22.4/22.6 (FIG. 6). Evaporated nitrogen flows in the lifter system 22.4 via a riser into a phase gas layerer. There is a lifter discharge valve 22.5 at the upper end of the lifter system 22.4 via which the gaseous nitrogen with the increased helium concentration can flow off. There is a further riser 22.6 in the lower area of the phase gas layerer in the lifter system 22.4 through which the clean gas, that is the helium-free nitrogen, can flow to the clean gas reservoir 30. In this case the phase gas layerer forms the foreign gas barrier with which the foreign gas helium is deflected from the mouth of the riser 22.6.

Figure 6A:
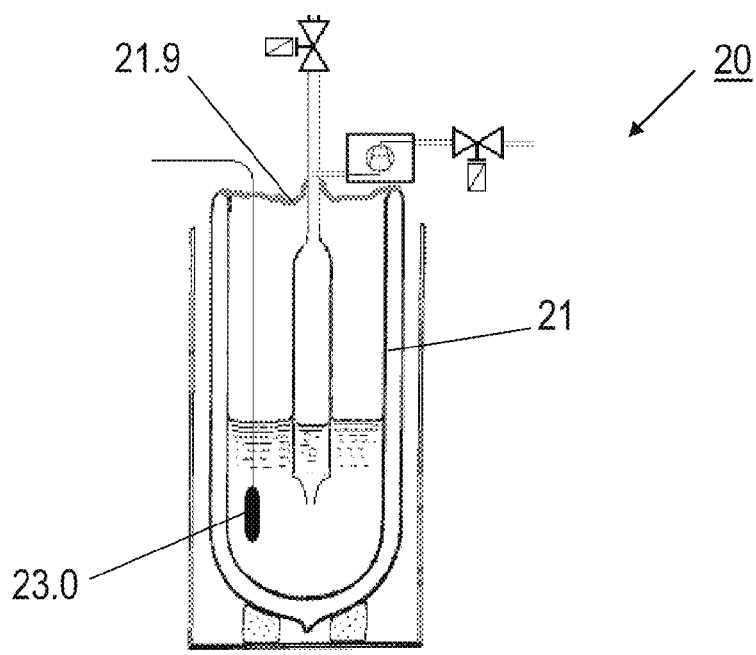

In a variant of the gas separation device 20 which corresponds to the embodiment of FIG. 1A, FIG. 6A illustrates that even then the concentration of impurities can be reduced if a Dewar vessel, open at the top, is provided as a thermally insulated tank 21. To do this liquefied gas is constantly being evaporated by a heating device 23.0. The discharging evaporated gas prevents atmospheric helium from diffusing into the liquefied gas so that the concentration of impurities can be kept very low. Furthermore, the Dewar vessel 21 should advantageously be covered by a hood 21.9 so that any diffusing of atmospheric helium into the Dewar vessel 21 is prevented. When removing gas using a delivery system, for example a delivery pump on a leak detector, one should pay attention to that the proportion of the removed gases is smaller by a factor of 50 than the gas flowing out of the Dewar vessel 21.

Figure 7:
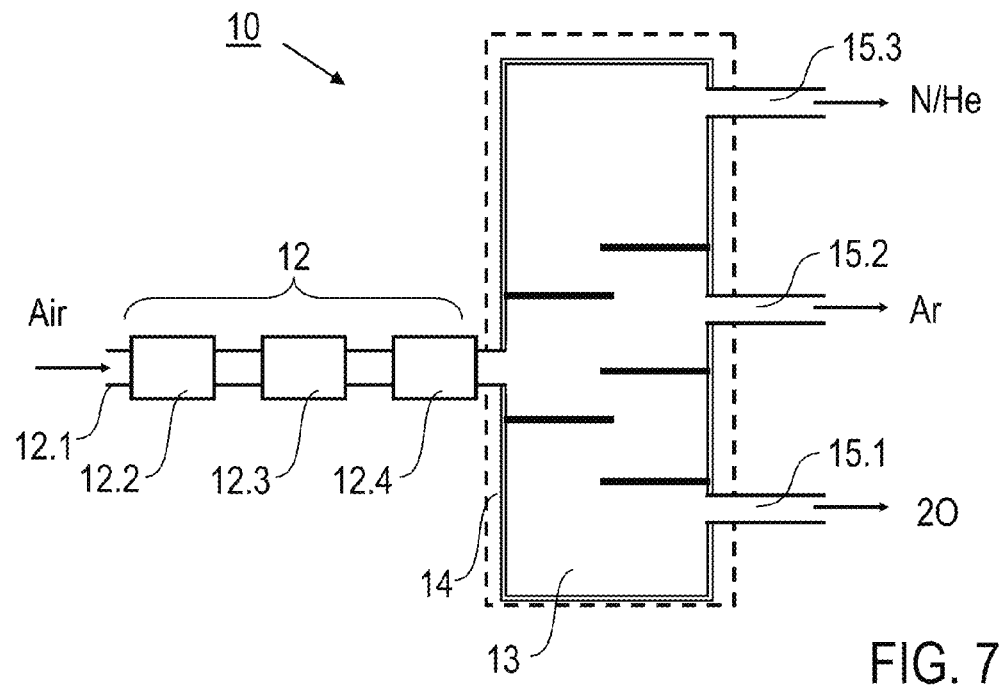
FIG. 7: a schematic representation of a gas mixture source for provision of a liquefied gas mixture.

FIG. 7 shows in a schematic cross-sectional view an air separation apparatus as a gas mixture source 10 (see FIG. 1) which is provided to supply the liquefied gas mixture 1 and preferably has a construction of a conventional commercially available plant for air separation. The air separation apparatus comprises an inlet opening 12.1 from which, for example, atmospheric air is led through preliminary stages 12 for pre-cleaning (12.2), compression (12.3) and pre-cooling (12.4) into a separating column 13. The separating column 13 is cooled using a cooling machine 14 and is equipped with three outlet openings 15.1 to 15.3 for removal of various fractions of the liquefied air. Oxygen, argon and nitrogen are removed accordingly in a liquefied condition via the lowermost, middle and uppermost outlet openings 15.1, 15.2 and 15.3. The liquid nitrogen still contains helium and possibly also further trace gases which are contained in the atmospheric air such as hydrogen, deuterium and neon. The argon and oxygen fractions can also contain helium dependent on the quality of separation occurring in the separation column 13.

The mixture of nitrogen and helium is subjected, as a liquefied gas mixture 1, to the production of helium-free nitrogen according to the invention. Enrichment of the nitrogen and separation of the helium out of the gas mixture take place using the gas separation device 20. The gas separation device 20 usually has a tank 21 to receive the liquefied gas mixture, a conduit device 22 to remove the clean gas and a foreign gas barrier 23, as described above with reference to FIGS. 1A to 6.

Figure 8:
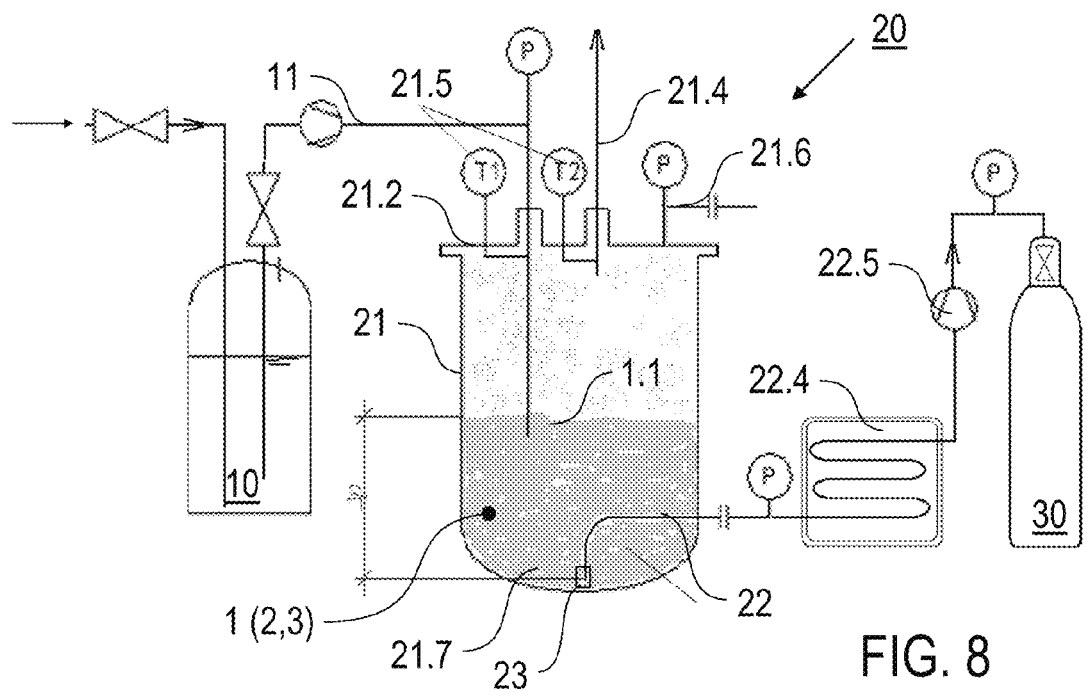
FIGS. 8 to 12: various embodiments of the separating devices used according to the invention for enriching the clean gas.

Further details about the gas separation device 20, which can be provided individually or in a combination are illustrated in FIGS. 8 to 12. Parts of the gas separation device 20 which correspond to the embodiment of the invention shown in FIG. 8 are labeled with the same reference numbers in FIGS. 9 to 12 as in FIG. 8.

FIG. 8 shows the gas separation device 20 with the individual tank 21 in which the liquefied gas mixture 1 with the clean gas 2 and the foreign gas 3 is provided. The tank 21 comprises a container made of metal or plastic which is preferably thermally insulated relative to its environment. The tank 21 has a volume of 150 l, for example. The feed line 11 passes through the cover 21.2 and can be decoupled from the gas mixture source 10. The free end of the feed line 11 opens out into tank 21. Furthermore, there is a pump line 21.4 passing through the cover 21.2. The pump line 21.4 is connected to a vacuum pump (not shown). The interior of the tank 21 can be evacuated via the pump line 21.4. The feed line 11 and the pump line 21.4 are each equipped with temperature sensors 21.5 which can be provided for controlling and/or regulating purposes. It is finally also optionally possible to provide an additional line 21.6 in the cover 21.2 which serves for special functions such as flushing of the tank 21 and is locked off in normal operations of production of the clean gas.

The conduit device 22 leads from the interior of the tank 21 to an evaporator 22.4 and a compressor 22.5 which is connected to the clean gas reservoir 30. The evaporator 22.4 and a compressor 22.5 are provided according to a preferred embodiment of the invention for providing a gaseous clean gas. In a modified embodiment of the invention the conduit device 22 can be directly connected with the clean gas reservoir 30 in order to receive the clean gas in a liquid condition and/or be equipped with the partial pressure separator 22.3 (see FIG. 2).

In order to produce clean gas the liquefied gas mixture 1 is transported by a delivery pump via the feed line 11 into the tank 21. The tank 21 is filled at least half way as shown. The fill level is particularly selected in such a way that the mouth of the feed line 11 ends in the liquid gas mixture in tank 21. The surface 1.1 of the gas mixture 1 in the tank 21 has a height above the bottom of the tank 21.7 which is at least 25 cm, in particular at least 15 cm, for example 50 cm or more. In a filled condition of the tank 21 a pressure difference $\Delta p$ is achieved in the hydrostatic pressure between the bottom area 21.7 and the surface 1.1 of the gas mixture 1. Separation out of the foreign gas takes place in the tank 21 through passage of the foreign gas up to the surface 1.1 while the clean gas 2 in the bottom area 21.7 is enriched.

The foreign gas 3 escapes at the surface 1.1 and is removed via the pump line 21.4 or collected in a separate reservoir. The enriched clean gas 2 is pumped via the conduit device 22 to the evaporator 22.4 and filled, after compression in the compressor 22.5, into the clean gas reservoir 30.

The liquefied gas mixture 1 is prepared as an undercooled liquid by creating a vacuum in the free space above the liquefied gas mixture 1 in the tank 21. Advantageously the effectiveness of separation of the foreign gas and clean gas can be increased in the condition as an undercooled liquid.

Figure 9:
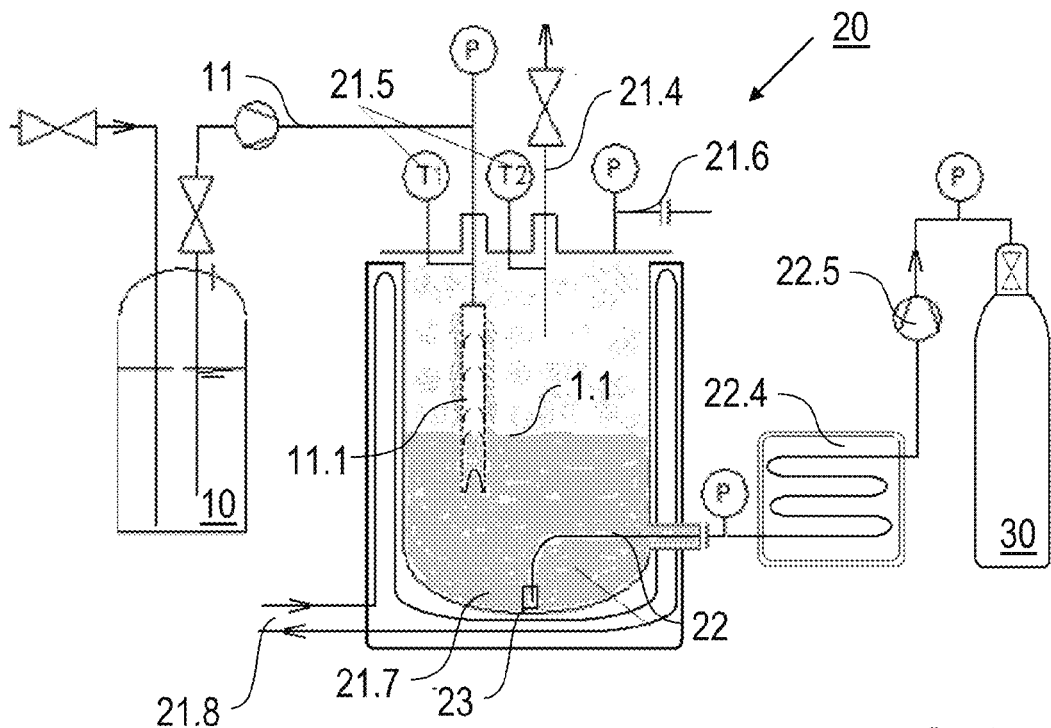

FIG. 9 shows a modified variant of the gas separation device 20 for which the additional measures for active cooling of the liquefied gas mixture are provided. A cooling device 21.8 is provided to cool the liquefied gas mixture 1 in tank 21. The cooling device 21.8 comprises a cooling circuit which surrounds the wall of the tank 21 and is connected with a freezing device (not shown). The cooling device 21.8 can be used to alter the condition of the liquefied gas mixture into that of an undercooled liquid. In order to enrich the nitrogen and to separate helium from the nitrogen, the cooling device 21.8 is used, for example, to set a temperature above the freezing point of the pure fraction, in particular a temperature below −195.7° C. based on normal pressure conditions.

The feed line 11 is furthermore provided with a liquid distributor 11.1. The liquid distributor 11.1 is arranged at the end of the feed line 11 and comprises a perforated pipe in which flow resistance elements are arranged on its inner side. The distributor 11.1 is provided to feed the flowing in liquefied gas mixture 1 into the tank 21 in the form of small droplets. Advantageously formation of droplets promotes separation of the helium from the nitrogen. Although it is just shown for the variant according to FIG. 9, the distributor 11.1 can also be provided for the other variants of the gas separation device 20.

Figure 10:
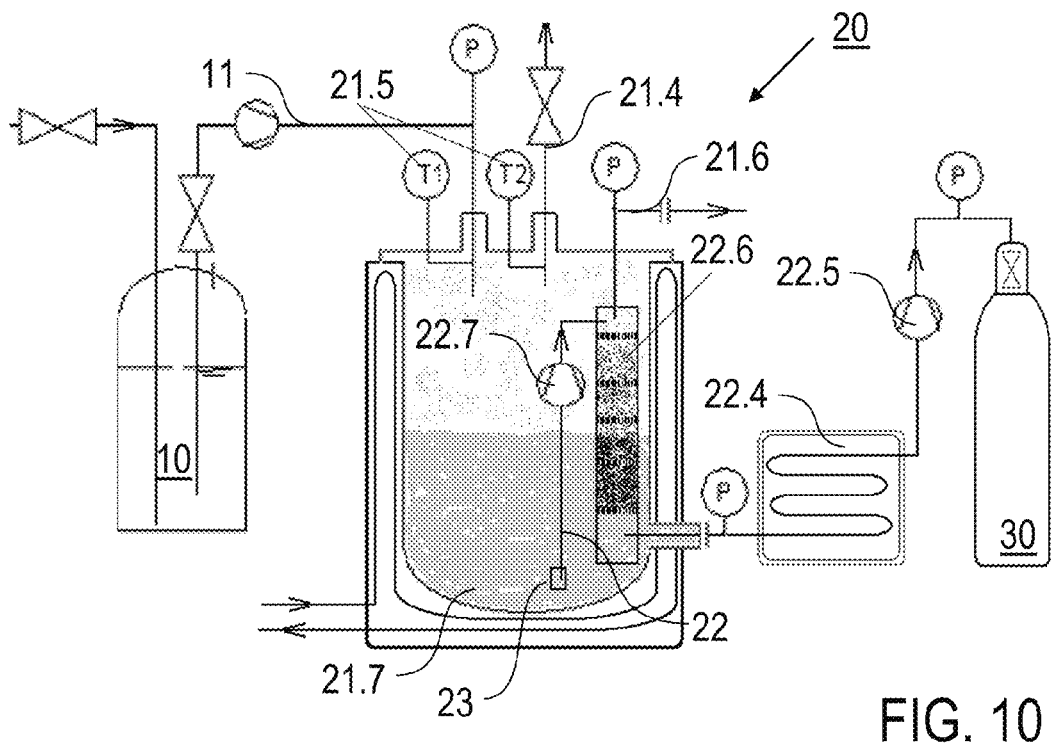
Figure 11:
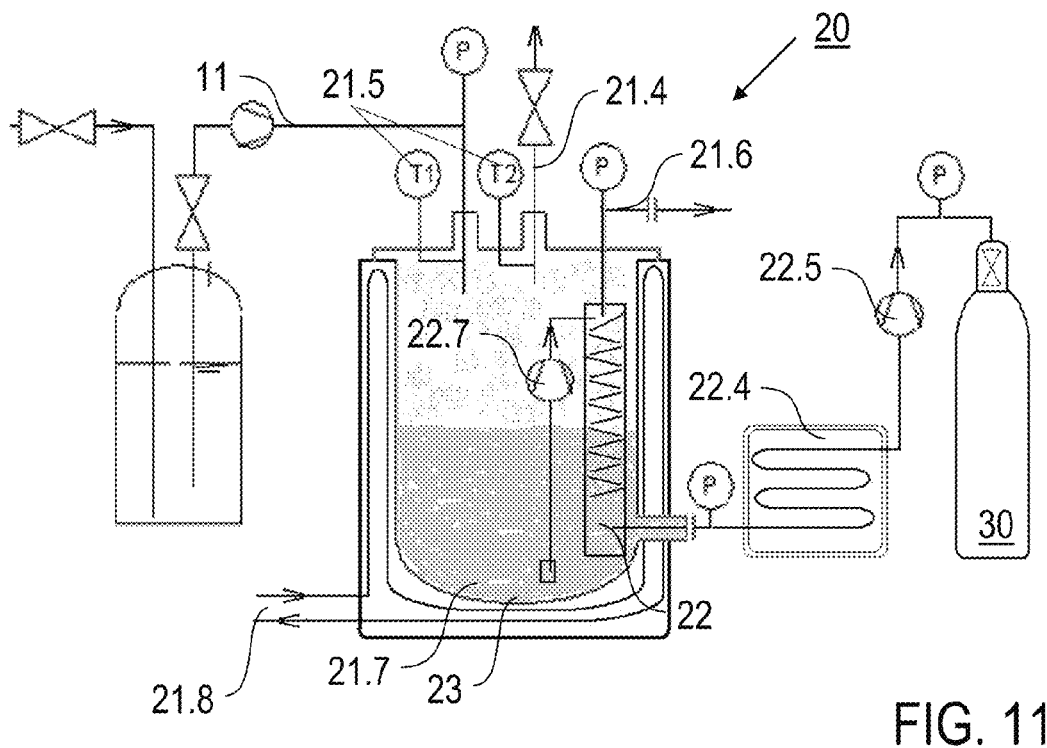

According to FIG. 10 there is a further separation stage provided in the conduit device 22 with which any residual gases still remaining in the enriched nitrogen can be separated. The separation stage comprises a surface cooler 22.6 through which the liquid clean gas from the bottom area of the tank 21.7 is led. For example, the surface cooler 22.6 comprises particulate packed bed (for example particles from ceramic balls) or separator plates (FIG. 11). There is a delivery pump 22.7 provided, for example, between the inlet opening of the conduit device 22 and the surface cooler 22.6 with which the liquefied gas mixture can be pumped. A locking element (not shown) is provided so that the surface cooler 22.5 can be separated from the interior of the tank.

The locking element is at first closed when operating the surface cooler 22.6. The surface cooler 22.6 is evacuated via the additional line 21.6 using a vacuum pump (not shown) and cooled through thermal contact with the liquefied gas mixture in tank 21. The locking element is opened to remove the clean gas 2. The quantity of liquid taken from the area of the bottom of the 21.7 of the tank 21 flows through the surface cooler 22.6, any remaining volatile gas residues being separated and pumped off via the additional line 21.6. The remaining nitrogen is received in the clean gas reservoir 30.

Figure 12:
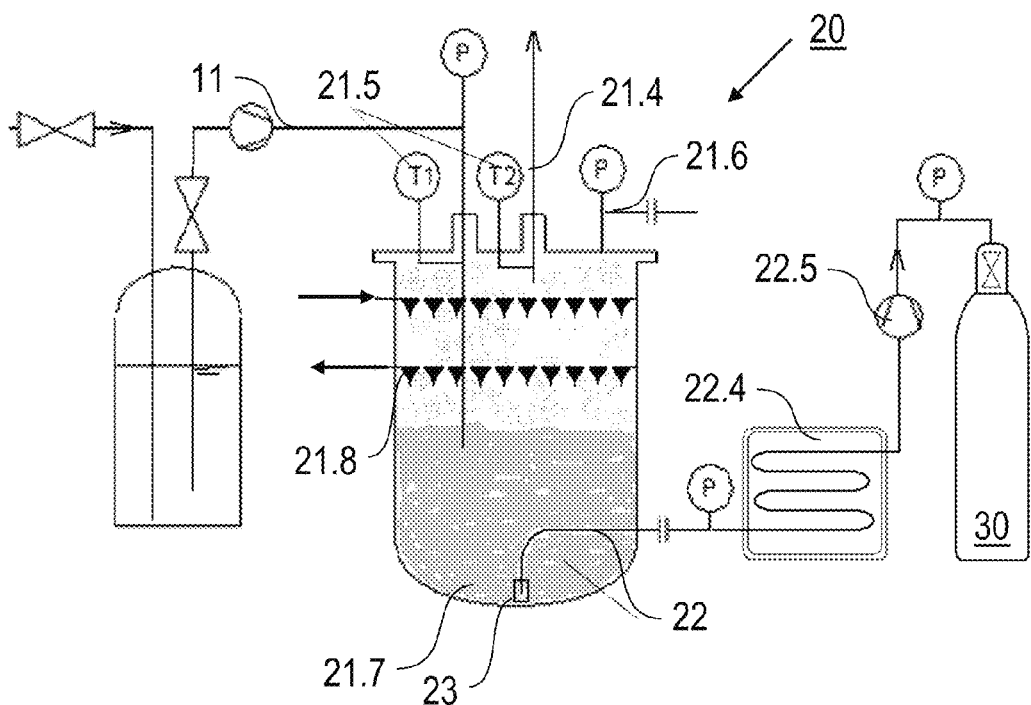

FIG. 12 shows a further variant for which additional cooling is provided using cooling device 21.8 in the free space above the liquefied gas mixture 1 in tank 21. By forming a temperature profile in the space above the liquefied gas mixture 1 enrichment of the clean gas in the bottom area of the tank 21.7 can be improved even further.

In order to form a noble gas free, physiological gas, noble-gas-free oxygen is produced using the process according to the invention which is added to the noble-gas-free nitrogen, preferably in the same volume ratio as occurs in atmospheric air, that is, for example N:O=21:79.

Leak Testing Using the Flushing Gas Method

FIGS. 13 to 27 illustrate embodiments of the leak testing according to the invention using the flushing gas method. The main feature of these embodiments of the invention is that the enriched clean gas, produced according to the above-mentioned process and possibly also modified using further noble-gas-free gases, is used as the flushing gas. Therefore in these figures a clean gas reservoir 30 is shown respectively as a source of the flushing gas which contains the produced, enriched clean gas according to the invention or, in particular, a noble gas free, physiological gas.

Figure 13:
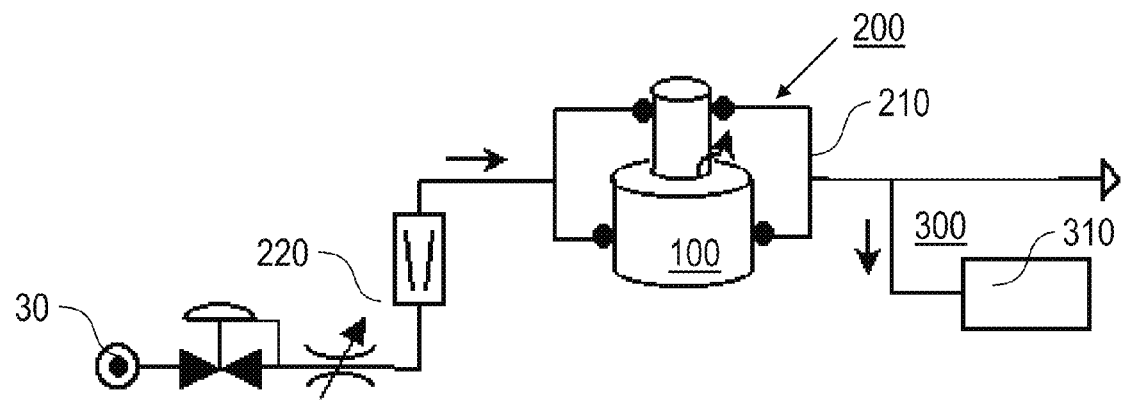
FIGS. 13 to 27: schematic illustrations of various embodiments of the leak testing according to the invention.

In FIG. 13 use of the enriched clean gas is illustrated for a leak testing system, which is disclosed, for example, in DE 10 2006 016 747 or in DIN EN ISO 15848-1:2006-04 (page 32). The hermetic flushing device 200 is placed on the construction component 100 to be tested, for example a vacuum device. The flushing device 200 comprises chamber walls 210 which enclose a local gas space on the surface of the construction component 100 to be tested. Pure gas from the gas clean gas reservoir 30 is flushed via a flushing gas regulating device 220 into the flushing device 200. Any test gas (helium) escaping from the inside of the construction component 100 through leak can be detected in the flushing gas in the flushing device 200 using a detecting device 300. For example, the detecting device 300 contains a mass spectrometer 310. The extreme high purity of the clean gas from the clean gas reservoir 30 allows the flushing gas method illustrated in FIG. 13 to be used to detect leaks with a leak rate of down to $10^{-13}$ Pa·m$^3$/s.

Figure 14:
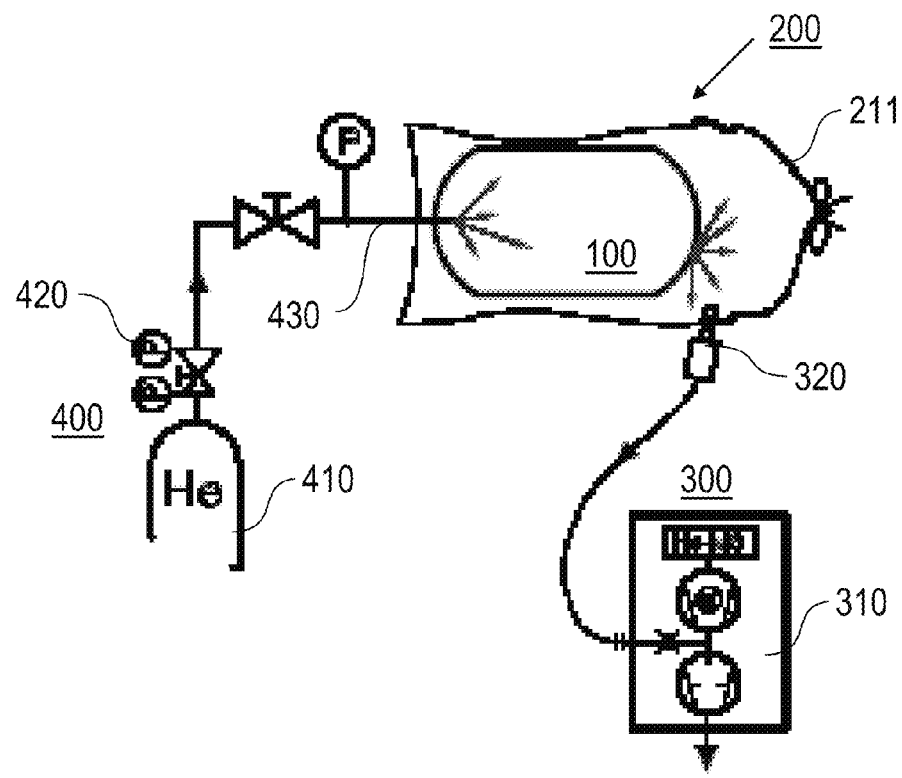

According to FIG. 14 the flushing device 200 comprises a flexible shell 211 which totally surrounds the construction component 100 to be tested. The construction component 100 to be tested is, for example, a vacuum device or another construction component to be tested for leaks such as a container or a tank. A test gas source 400 is connected with a test gas reservoir 410, a regulating device 420 and a feed line 430 are connected with the construction component 100. The detecting device 300 surrounds the detector 310 and a sniffer probe 320 which is led into the shell 211.

The shell 211 is flushed, filled with the clean gas produced according to the invention and then sealed for leak testing on the construction component 100. The interior of the construction component 100 is then pressurized with the test gas helium. It is possible to pass over the surface of the construction component 100 with the sniffer probe 320 to determine any leaks.

Using the process illustrated in FIG. 14 it is possible, for example, to realize the overpressure process according to DIN EN 177 9-B3 or according to the sniffer method described in DE 103 06 245. The extreme purity of the flushing gas used according to the invention allows that a very substantially improved sensitivity can be achieved compared to that obtained using conventional techniques.

Figure 15:
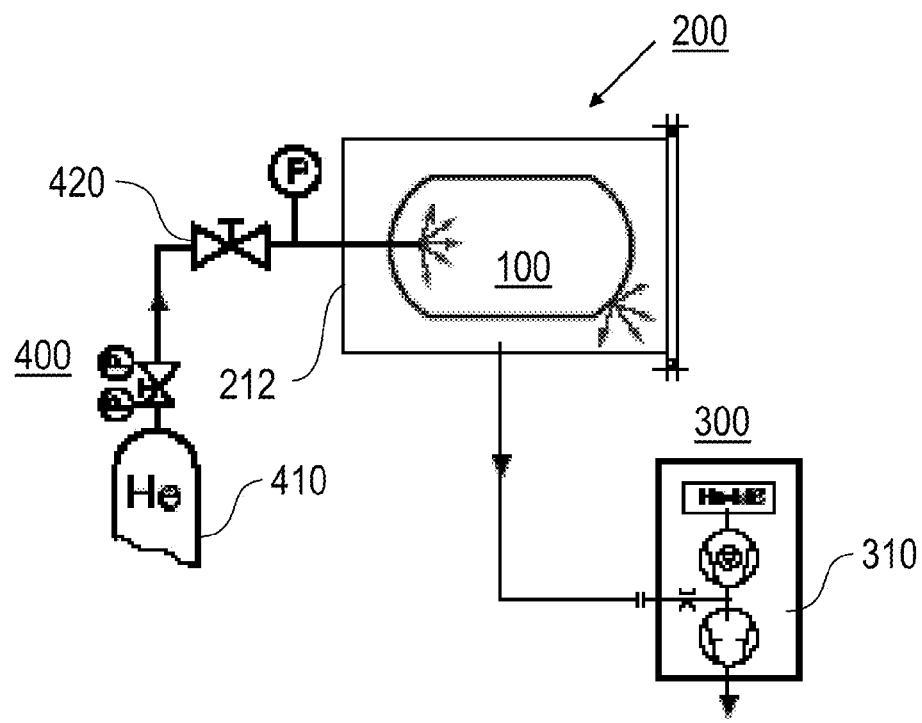

FIG. 15 illustrates a modified variant of the flushing gas method for which the flexible shell according to FIG. 14 is replaced by a solid chamber 212. As described for the process above, the chamber 212 is closed off after flushing with the clean gas produced according to the invention. If there is a leak in the construction component 100 the test gas helium flows out of the construction component 100 under pressure into the chamber 212 so that helium can be detected in it in using the detecting device 300.

The processes illustrated in FIGS. 14 and 15 can be modified in such a way that the shell 211 or the chamber 212 is connected for a running flushing operation with the clean gas reservoir 30, feeding in of the flushing gases is preferably adjusted using a flushing gas regulating device according to FIG. 13 (reference number 220).

Figure 16:
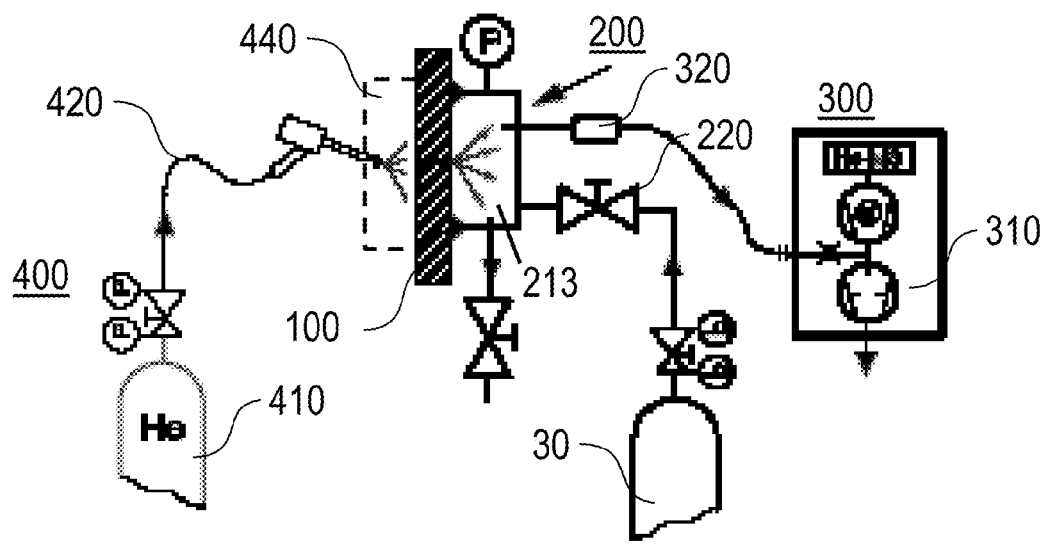

According to FIG. 16 the construction component 100 to be tested (shown in part) comprises a solid wall of a container, a vacuum device or a similar item. In this case the flushing device 200 comprises a chamber 213 which is placed hermetically on one side of the construction component 100. The chamber 213 is also designated as bell. The clean gas source 30 is connected to the chamber 213 via the flushing gas regulating device 220. Furthermore the sniffer probe 320 for the detecting device 300 is connected to the inside of the chamber 213.

The surface of the construction component 100, which is set opposite to the surface with the chamber 213, is pressurized with the test gas helium. A test gas space 440 (shown in dashed lines) can be placed opposite the chamber 213 for localization and enrichment of the test gas which consists, for example, of a flexible foil or rigid chamber walls.

To perform a leak test the chamber 213 (bell) is flushed with the clean gas produced according to the invention and, after flushing, overpressurized with the clean gas produced according to the invention. If the construction component 100 is sprayed on the rear side with the test gas helium, this test gas will flow through any leak present into the chamber 213. Use of the clean gas produced according to the invention allows leaks to be detected which lie under $10^{-9}$ Pa·m³/s. Using the test gas space 440 a detection limit of below $10^{-10}$ Pa·m³/s can be reached.

Figure 17:
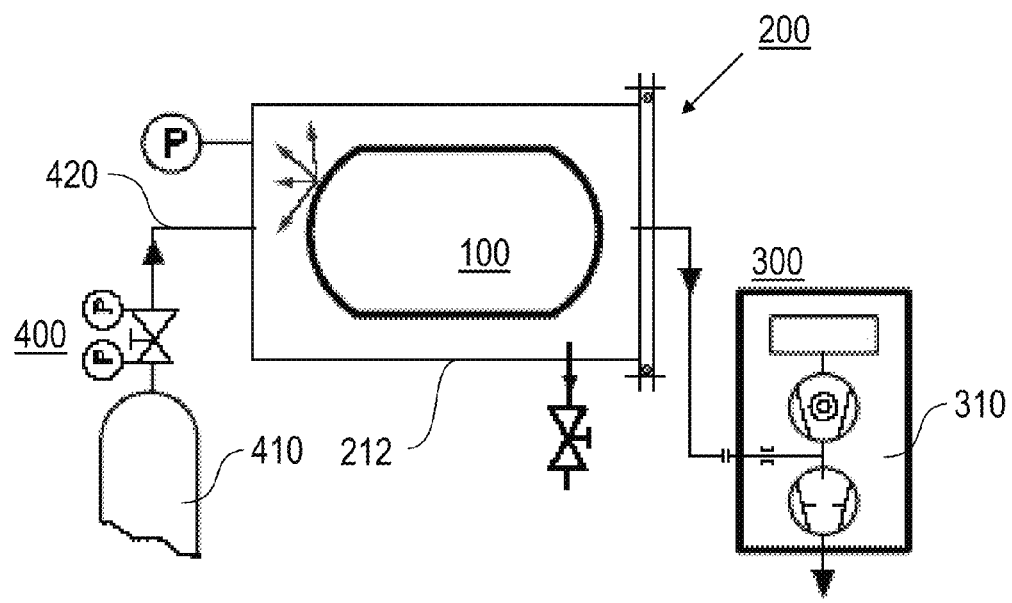

The clean gas produced according to the invention can furthermore be used for hyperbaric storage testing (in particular according to the standard DIN EN 1779, B5, so-called "bombing") (FIG. 17). The construction component 100, which is neither attached to a test gas source nor a detecting device, is subjected to an overpressure of helium in a closed chamber (not shown). The test gas helium penetrates trough any leaks in the construction component 100. The construction component which has been subjected in this way to the test gas helium under pressure is subsequently placed in the chamber 212 of the flushing device 200 as shown schematically in FIG. 17. The chamber 212 is flushed using the clean gas produced according to the invention from the clean gas reservoir and subsequently permanently subjected to an overpressure relative to the environment. If there is a leak on the construction component, the test gas helium flows into the chamber 212 and will be detected there by the detecting device 300.

Figure 18:
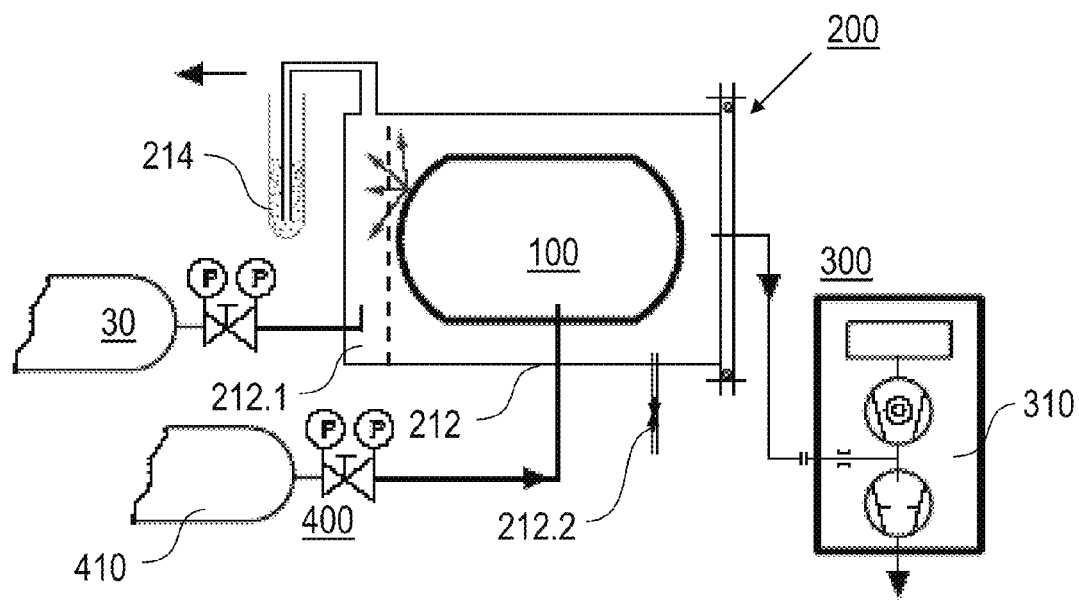

FIG. 18 illustrates use of the produced clean gas produced according to the invention for leak testing using the so-called overflow process. The construction component 100 to be tested is placed in a solid chamber 212 and connected to the test gas source 400. The clean gas produced according to the invention is fed into the chamber 212 from the clean gas reservoir 30. The flushing gas can escape into the environment through a pressure equalizing line 214. The pressure equalizing line 214 is equipped with a locking device such as a mechanical lock or liquid seal according to FIG. 14. In the case of a liquid seal the flushing gas flows through a liquid column, for example made of water, into the environment. To perform a leak test, detection is undertaken using the detecting device 300 to check whether the test gas helium has escaped from the inside of the construction component 100 into the chamber 212.

The process according to FIG. 18 can be modified in such a way that an overflow chamber 212.1 (shown in dashed lines) is provided in the chamber 212. In this modified process the flushing gas produced according to the invention permanently flows via the overflow chamber 212.1 into the environment. To determine the tightness of the construction component 100 the chamber 212 is at first flushed with flushing gas, the flushing gas flowing in via an opening in the separating wall of the overflow chamber 212.1 into the main chamber 212 and flows out via a separate valve 212.2. Valve 212.2 is closed for leak testing so that the flushing gas flows only through the overflow chamber 212.1 into the environment. This process can be used to detect possible leaks in the construction component 100 at higher speed.

The locking device for the pressure equalizing line 214 such as the liquid seal advantageously prevents atmospheric helium from flowing from the environment into the chamber 212. This measure significantly improves the sensitivity of the leak testing according to the invention.

Figure 19:
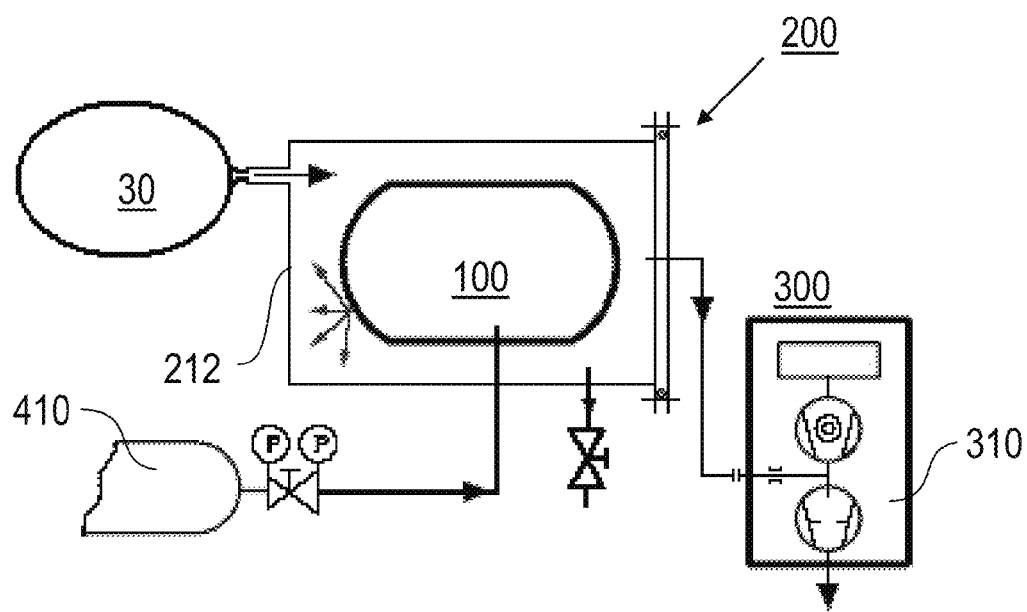

FIG. 19 shows a variant of the leak testing according to the invention in which the flushing gas reservoir 30 comprises an unpressurized reservoir. For example, the chamber 212 in the flushing device 200 is connected with an expandable or unfoldable, flexible balloon which is filled with the clean gas produced according to the invention. The clean gas flows from balloon into the chamber 212, as is provided for conventional process of the flushing gas method, with suction of ambient air through a flushing device. However, considerably improved sensitivity of the leak testing is achieved through use of the clean gas produced according to the invention.

Figure 20:
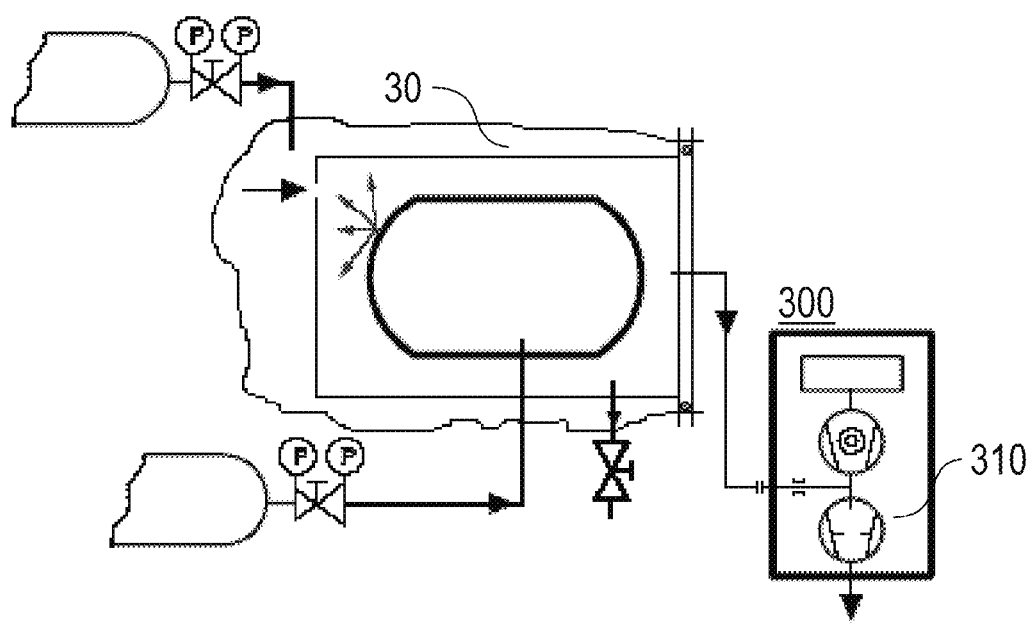

The process according to FIG. 19 can be modified in such a way that the construction component to be tested is fully arranged in the clean gas reservoir 30, that is in the balloon, and the detecting device 300 is also connected with the clean gas reservoir 30. In this case a variant of the invention results which corresponds with the above-mentioned shell process and is illustrated in FIG. 20.

Figure 21:
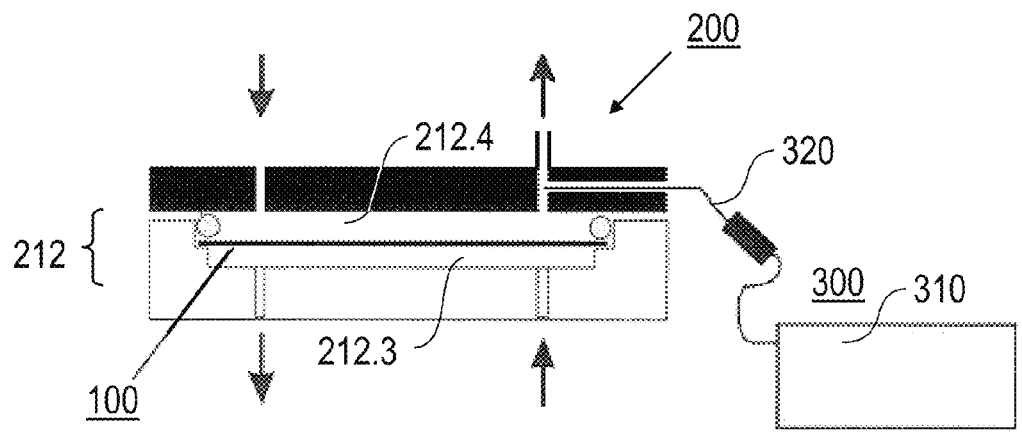

FIG. 21 illustrates an embodiment of the invention in which the process for leak testing is used for determining the permeation through a construction component, for example a foil 100 or a bursting disc for vacuum devices. The construction component 100 is arranged in a measuring chamber 212 of the flushing device 200 in such a way that the measuring chamber 212 is sub-divided into two sub-chambers 212.3, 212.4. The separated sub-chambers are also designated as the feed side and the permeate side.

After closing off the chamber 212 the feed side is pressurized with test gas while clean gas produced according to the invention is flowing through the permeate side. The detecting device 300 is connected to the outlet line on the permeate side (sub-chamber 212.4).

The determination of the permeation of the construction component 100 comprises measurement of the test gas concentration in the flushing gas flowing off. Use of the clean gas produced according to the invention can significantly increase the sensitivity of the measurement process to determine permeation compared to that obtained using conventional techniques. It is also possible to provide a locking device for the process according to FIG. 21, which is illustrated above in FIG. 18. The locking device prevents atmospheric test gas from flowing from the environment into the sub-chamber 212.4.

Figure 22:
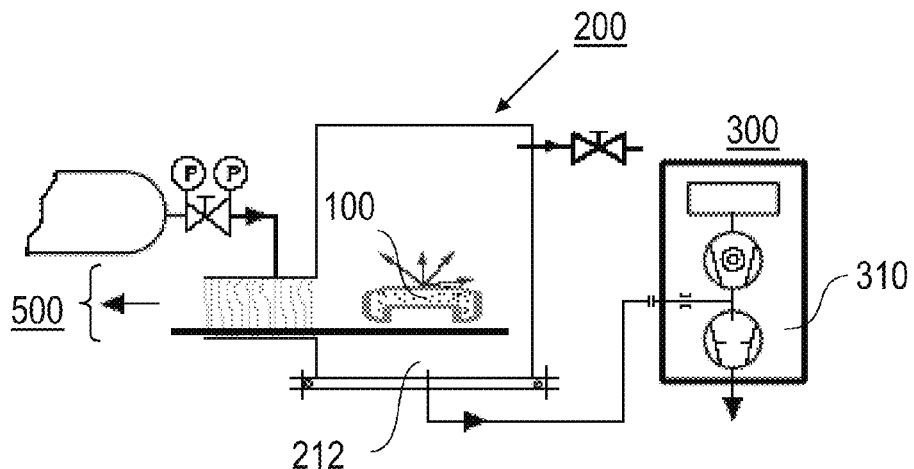

FIG. 22 illustrates a further embodiment of the leak testing according to the invention with an opened chamber 212 which is equipped with a lock device 500. The lock device 500 comprises, for example, a pressure equalizing line with a cross-section of a size such that the construction component 100 to be tested can be transported through the lock device 500 into the chamber 212. In order to improve the locking effect, additional blinds made of foil or lock gates can be arranged in the pressure equalizing line of the lock device 500.

To determine the tightness of the construction component 100 it is at first pressurized with the test gas helium as, for example, in the above-mentioned "bombing" process, until an increased internal pressure is achieved. The pressurized construction component 100 is then positioned through the lock device 500 in the chamber 212. The chamber 212 is flushed with the flushing gas produced according to the invention. The detecting device 300 is connected with the chamber 212 to detect any leaks. If a leak occurs the concentration of test gas will increase in the chamber 212 so that leaks in the construction component 100 can be detected.

Figure 23:
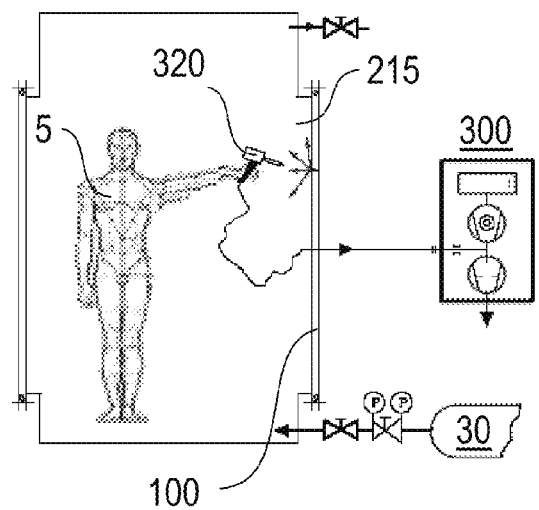

FIG. 23 illustrates an embodiment of the invention in which the flushing device comprises a chamber 215 with fixed walls and of such a size that an operator 5 can enter the chamber 215. The chamber 215 can be formed by the construction component to be tested itself (see below, FIG. 27). In the embodiment according to FIG. 23 the construction component 100 to be tested is inserted gas tight into an opening in the wall of chamber 215 or just part of the construction component to be tested. To detect a leak the construction component 100 to be tested is pressurized with test gas and the interior of the chamber 215 is flushed using the clean gas produced according to the invention from the clean gas reservoir 30. In this case a gas composition made out of nitrogen and air is used as clean gas which forms a physiological gas.

The operator 5 can enter the closed chamber 215 and operate a test gas sensor in there such as a sniffer probe 320. The operator 5 can move the sniffer probe 320 along the inner surface of the construction component 100 to localize a leak. Helium or a helium containing gas mixture can be used as a test gas used to pressurize the construction component 100. A test gas space can be provided to concentrate the test gas on a particular area of the surface (see FIG. 16, 440).

One particular advantage of the process illustrated in FIG. 23 is that the localization of any existing leaks can be accelerated immensely due to movement of the sniffer probe 320 by the operator 5. At the same time localization of leaks can be achieved with the increased sensitivity since physiological gas is used as the flushing gas in the chamber 215 which was freed of helium using the process according to the invention.

Alternatively, or additionally, a noble-gas-free diffusion moderator gas can be added to the flushing gas produced according to the invention which also secures a reduction of the diffusion speed of helium. Gases used as a diffusion moderator gas (or: a buffer gas) can, for example, be carbon dioxide or water vapor. The effect of the diffusion moderator gas is based on the phenomenon that its atoms or molecules form clusters in a gaseous state due to dipole interactions which prevent diffusion of helium in the chamber 215.

Figure 24:
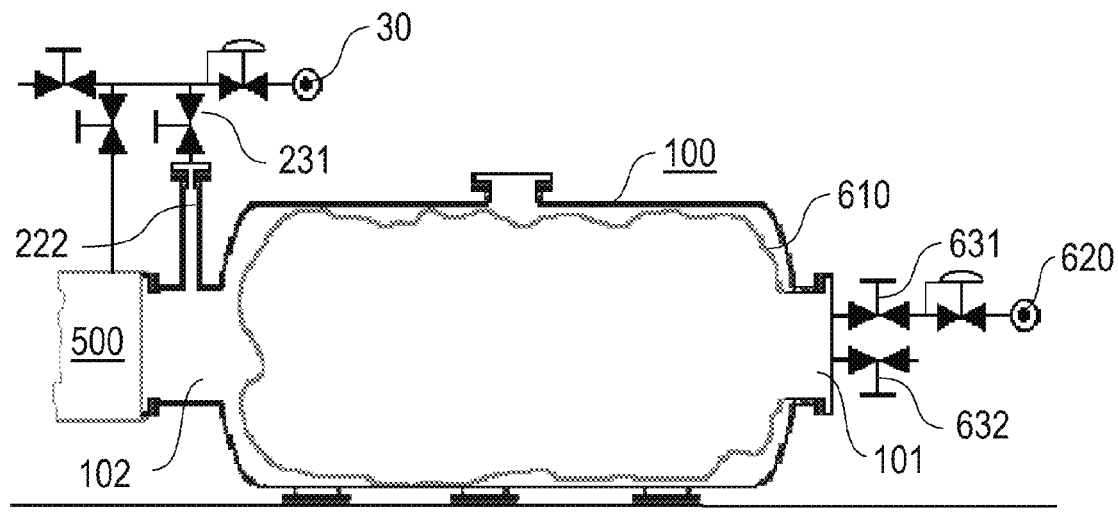
Figure 25:
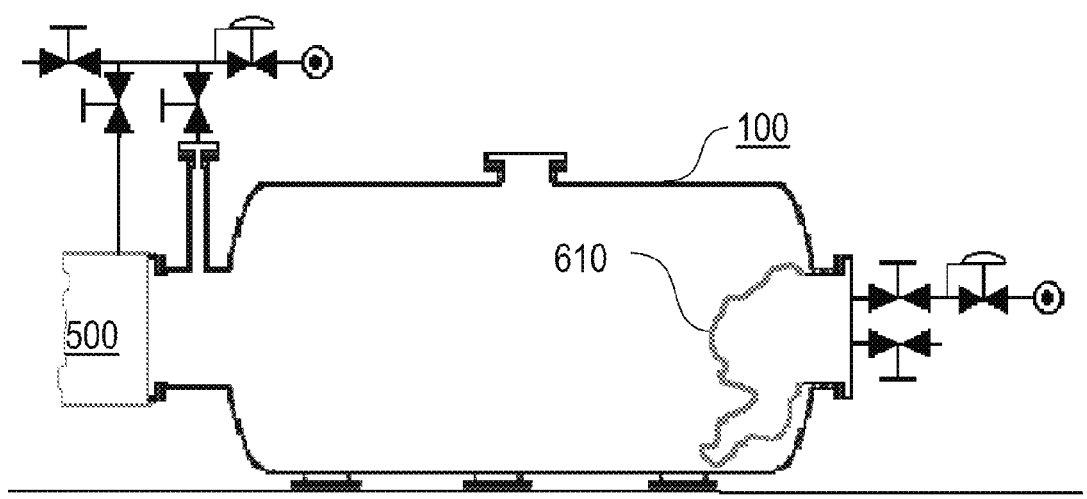

FIGS. 24 and 25 illustrate a further embodiment of the leak testing according to the invention on an extended construction component such as a liquid storage tank 100.

The liquid storage tank 100 is flushed from inside using the clean gas produced according to the invention in order to perform a leak test. An inflatable pressurized gas reservoir 610 is attached to a first container flange 101 in order to reduce the flushing gas volumes. The pressurized gas reservoir 610 comprises, for example, a balloon made of a flexible, unfoldable or stretchable foil material. Furthermore there is a source of compressed air 620 attached to the flange 101 with which the compressed gas reservoir 610 can be inflated until this essentially fills the internal volume of the liquid storage tank 100. A compressed air valve 631 is subsequently closed as the pressurized gas source 620 and the remaining inner room of the liquid storage tank 100 is flushed with flushing gas from the clean gas source 30. To do this, the flushing gas valve 231 is opened so that the clean gas flows over a connecting line 222 and a further flange 102 of the liquid storage tank 100. A second compressed air valve 632 is opened as soon as the pressure of the flushing gas in the container exceeds the pressure in the pressurized gas reservoir 610. The overpressure of the flushing gas supply pushes the compressed air in the pressurized gas reservoir 610 to the outside, the pressurized gas reservoir 610 pulling back to the first flange 101 (FIG. 25). There is also the possibility of controlled pumping of the pressurized gas reservoir 610 by connecting the pressurized gas reservoir 610 to a delivery pump (not shown) and using this to pump out the pressurized gas reservoir 610.

In order to perform a leak test the liquid storage tank 100 can subsequently be entered by an operator (not shown) through a lock device 500. When using a physiological gas composition as a flushing gas the operator can freely move in the liquid storage tank 100 in order to localize leaks using the sniffer method. To do this, certain segments of the liquid storage tank 100 can be wrapped on the outside of the liquid storage tank 100 with shells and pressurized with test gas in order to simplify localization of leaks.

It can be advantageous when the diffusion speed of the test gas from a leak in the chamber 215 is reduced for localization of a leak in an accessible test chamber, for example according to FIGS. 23 to 26. A number of measures can be provided to do this. According to a first variant, a flushing gas pressure is set in the chamber 215 which is higher than the ambient atmospheric pressure. The pressure difference can be at least 15 mbar for example. The diffusion speed of helium is reduced in the flushing gas at increased pressure so entry of helium from a leak in the chamber 215 is slowed down during spreading into the interior of the chamber. This simplifies detection of concentration gradients through movement of the sniffer probe 320 over the surface of the construction component 100. As a result the leak can be easier localized.

Figure 26:
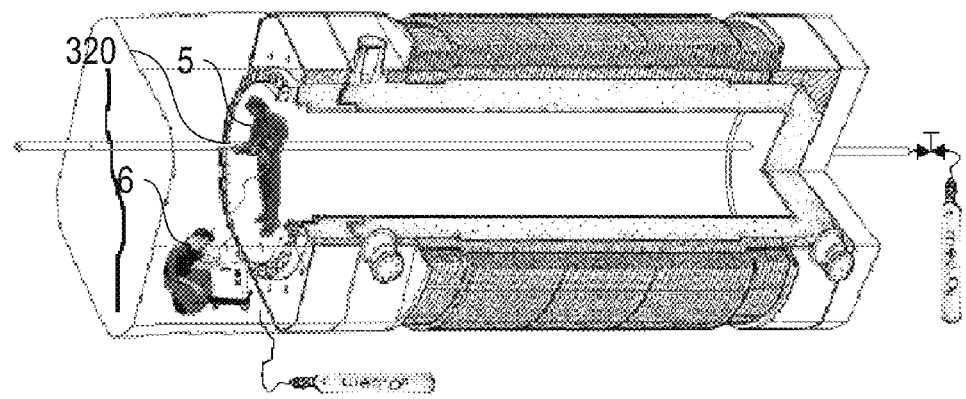

FIG. 26 illustrates leak testing on an extended container 100 with a first operator 5 who searches in the vessel 100 for leaks using a sniffer probe 320 and a second operator 6 who pressurizes the outer wall of the vessel 100 with test gas.

Figure 27:
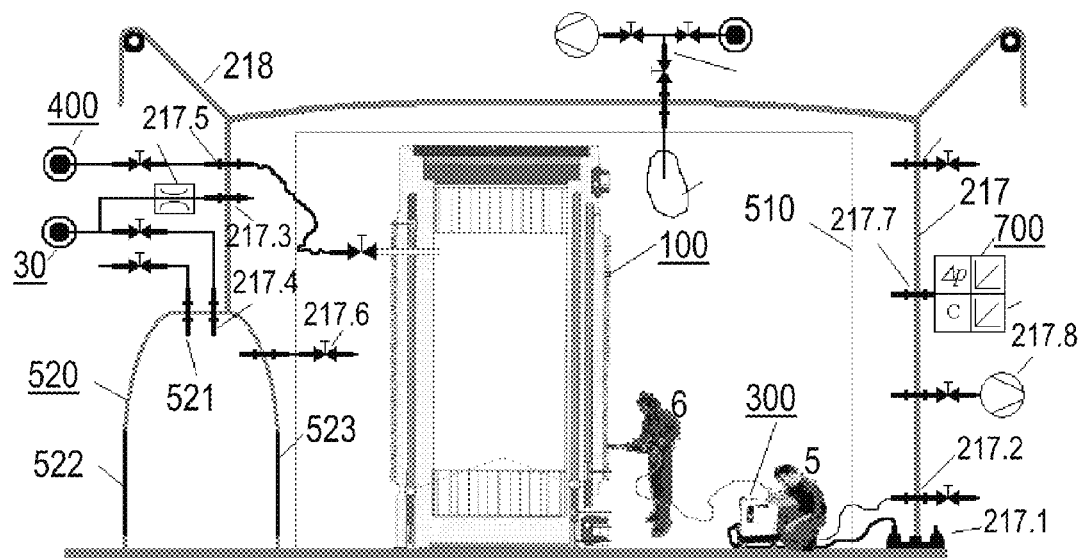

FIG. 27 illustrates a further variant of the leak testing according to the invention in which two operators 5, 6 work in a, noble-gas-free physiological gas composition produced according to the invention. The construction component 100 to be tested, such as clean room cabinet, is arranged in a chamber 217 which is hermetically sealed from the environment. The chamber 217 is equipped with a lock device which comprises a material lock 510 to provide the construction component 100 in the chamber 217 and an entry personnel lock 520 to allow the operators 5, 6 to enter the chamber 217. The chamber 217 is also equipped with a number of gas-tight line lead-throughs 217.1 to 217.7. There is, for example, provision made for a current lead-through 217.1 for supplying electrical power to the detection device 300 operating in the chamber 217. An exhaust gas line 217.2 is also connected to the detection system 300. The clean gas reservoir 30 is connected via the feed line 217.3 and the interior of the chamber 217 and via the lock line 217.4 with the personnel lock 520. A discharge line 521 serves to equalize the pressure in the personnel lock 520. The test gas source 400 is connected via the test gas line 217.5 with the interior of the construction component 100 to be tested.

The valves in the lines 217.3, 217.4 and 521 are opened to flush the chamber 217 and the personnel lock 520. The clean gas produced according to the invention (noble-gas-free, physiological gas) flows into the chamber 217 and the personnel lock 520. There is optionally the possibility to use the flushing gas from the chamber 217 to flush the personnel lock 520. The overflow line 217.6 between the chamber 217 and the personnel lock 520 is provided to do this.

The composition of the flushing gas in the chamber 217 is monitored using a flushing gas sensor device 700 connected via a sensor line 217.7 with the interior of the chamber 217. There is particularly a pressure measurement provided to determine the overpressure of the flushing gas in the chamber 217 relative to the ambient environment and a concentration measurement to monitor the oxygen concentration in the flushing gas. The helium concentration in the flushing gas is monitored using the detection device 300.

If a helium concentration in the chamber 217 reaches below 1.0 ppb the flushing can be terminated. To do this the valves in the lines 217.3, 217.4 and 521 are closed and the feeding of the flushing gas is adjusted in such a way that an overpressure in the chamber 217 relative to atmospheric pressure of about 15 (+/−10) mbar is maintained. The pressure setting can be done manually or by using a pressure or volume flow regulation system.

Once flushing of the chamber 217 is completed it can be entered through the personnel lock 520. First the outer lock door 522 is opened so that the operator can enter the personnel lock 520. Once the outer lock door 522 is closed and flushing of the personnel lock 520 with helium-free clean gas has taken place, the inner lock door 523 is opened so that the chamber 217 can be entered.

The construction component is pressurized with helium via the line 217.5 to allow localization of leaks. For example, in the construction component 100 an overpressure is set of 10 bar using compressed air (with a helium concentration of 5.24 ppm). The background helium concentration set of less than 1.0 ppb in the chamber 217 outside the construction component 100 allows a significant increase in the sensitivity of the helium sniffer testing compared to a conventional process.

FIG. 27 illustrates an optionally provided pressurized gas reservoir 217.8 with which the flushing gas volume in the chamber 217 can be minimized. Use of the pressurized gas reservoir 217.8 takes place according to the process described above with reference to the FIGS. 24 and 25 with a pressurized gas reservoir 630.

One further advantageous feature of the invention is the optionally provided clamping device 218 which is illustrated schematically in FIG. 27. The clamping device 218 allows the form and size of the chamber 217 to be adjusted to the construction component 100 to be tested.

The features of the invention disclosed in the descriptions above, the drawings and the claims can be of significance both individually and also in combination for realizing the potential of the invention in its various embodiments.

The invention claimed is:

1. A process for production of a clean gas, comprising the steps of:
   providing a liquefied gas mixture which contains the clean gas and at least one foreign gas, in a gas separation device,
   enriching the clean gas to provide an enriched clean gas, wherein the at least one foreign gas is transferred into a surface region of the liquefied gas mixture, and
   removing the enriched clean gas, wherein the enriched clean gas flows off via a conduit device from a volume region of the gas separation device,
   wherein a foreign gas barrier is formed at the conduit device and the at least one foreign gas in the liquefied gas mixture is led away from a mouth of the conduit device.

2. The process according to claim 1, wherein the enriched clean gas is received in a clean gas reservoir, and a partial pressure separator is provided between the gas separation device and the clean gas reservoir.

3. The process according to claim 1, wherein the clean gas has a foreign gas concentration which is less than 1 ppb.

4. The process according to claim 3, wherein the clean gas has a foreign gas concentration which is less than 10 ppt.

5. The process according to claim 1, wherein the clean gas comprises nitrogen and the process further comprises the step of adding a quantity of noble-gas-free oxygen to the nitrogen.

6. The process according to claim 5, wherein the quantity of noble-gas-free oxygen is selected such that mixing the noble-gas-free oxygen and nitrogen forms a physiological gas.

7. The process according to claim 1, further comprising the step of adding a noble-gas-free diffusion moderator gas to the clean gas.

8. The process according to claim 1, wherein helium is separated from the gas mixture and the clean gas is helium-free.

9. The process according to claim 1, wherein the enriched clean gas is in a solid, liquid or evaporated state and is received in:
   a gas-tight gas vessel which has diffusion protected locking members, or
   a Dewar vessel.

10. A device for production of a clean gas, comprising:
   a gas mixture source for provision of a liquefied gas mixture which contains the clean gas and at least one foreign gas,
   a gas separation device for receiving the liquefied gas mixture and for separation of the clean gas from the liquefied gas mixture, and
   a conduit device for removing the clean gas from the gas separation device, wherein
   the conduit device is provided with a foreign gas barrier which is adapted to lead the foreign gas in the liquefied gas mixture away from a mouth of the conduit device.

\* \* \* \* \*